(12) United States Patent
Teramoto et al.

(10) Patent No.: US 12,293,336 B2
(45) Date of Patent: May 6, 2025

(54) TIRE MANAGEMENT SYSTEM, TIRE MANAGEMENT METHOD

(71) Applicant: Sumitomo Rubber Industries, Ltd., Kobe (JP)

(72) Inventors: Masaki Teramoto, Kobe (JP); Kazuharu Tanimura, Kobe (JP); Takahiro Nishimoto, Kobe (JP); Kenji Yoneda, Kobe (JP); Yukinori Hashimoto, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/021,396

(22) PCT Filed: Oct. 13, 2021

(86) PCT No.: PCT/JP2021/037897
§ 371 (c)(1),
(2) Date: Feb. 15, 2023

(87) PCT Pub. No.: WO2022/123897
PCT Pub. Date: Jun. 16, 2022

(65) Prior Publication Data
US 2023/0306378 A1    Sep. 28, 2023

(30) Foreign Application Priority Data
Dec. 11, 2020  (JP) ................. 2020-206257

(51) Int. Cl.
*G06Q 10/20* (2023.01)
*G06Q 30/0207* (2023.01)
*G07C 5/00* (2006.01)

(52) U.S. Cl.
CPC ......... *G06Q 10/20* (2013.01); *G06Q 30/0213* (2013.01); *G07C 5/006* (2013.01)

(58) Field of Classification Search
CPC ............... G06Q 10/20; G06Q 30/0213; G06Q 30/0207; G06Q 50/30; G07C 5/006; B60S 5/04; B60C 23/04
See application file for complete search history.

(56) References Cited

U.S. PATENT DOCUMENTS 11,107,104 B1 * 8/2021 Brannan ............... H04L 51/046
2009/0195373 A1   8/2009 Lettieri et al.
(Continued)

FOREIGN PATENT DOCUMENTS

ES         2348658 T3       12/2010
JP      2001-033259 A        2/2001
(Continued)

OTHER PUBLICATIONS

International Search Report mailed on Dec. 21, 2021, received for PCT Application PCT/JP2021/037897, filed on Oct. 13, 2021, 10 pages including English Translation.
(Continued)

*Primary Examiner* — John Van Bramer
(74) *Attorney, Agent, or Firm* — XSENSUS LLP

(57) ABSTRACT

A tire management system (100) includes: a first communication apparatus (2) that acquires state information regarding a state of a tire (11) that is transmitted from an air pressure detection device (12) provided in a vehicle (1) when the vehicle (1) is located in a communication range of a predetermined wireless communication standard; and a management server (4) including a storage processing portion (70) that stores, into a storage portion (43), the state information acquired by the first communication apparatus (2).

13 Claims, 9 Drawing Sheets

(56) References Cited

U.S. PATENT DOCUMENTS

| | | | |
|---|---|---|---|
| 2020/0215859 A1* | 7/2020 | Horikoshi | B60C 23/0486 |
| 2021/0004848 A1* | 1/2021 | Nakajima | B60L 53/80 |
| 2021/0107324 A1* | 4/2021 | Kalyanaraman | B60C 23/04 |

FOREIGN PATENT DOCUMENTS

| | | | | | |
|---|---|---|---|---|---|
| JP | 2004-13449 A | | 1/2004 | | |
| JP | 2004013449 A | * | 1/2004 | | G06F 17/60 |
| JP | 2019-6266 A | | 1/2019 | | |
| JP | 2019-182330 A | | 10/2019 | | |
| WO | 2019/049714 A1 | | 3/2019 | | |
| WO | WO-2019155712 A1 | * | 8/2019 | | G06Q 50/10 |
| WO | 2019/181700 A1 | | 9/2019 | | |
| WO | 2019/202770 A1 | | 10/2019 | | |

OTHER PUBLICATIONS

Office Action issued on Feb. 2, 2021, in corresponding Japanese patent Application No. 2020-206257, 3 pages.

Extended European search report issued on Jul. 12, 2024, in corresponding European patent Application No. 21903001.2, 126 pages.

* cited by examiner

TIRE MANAGEMENT SYSTEM, TIRE MANAGEMENT METHOD

CROSS-REFERENCE TO RELATED APPLICATIONS

The present application is a 371 of PCT filing PCT/JP2021/037897, filed Oct. 13, 2021, which claims priority from JP 2020-206257, filed Dec. 11, 2020, where the entire contents of each are incorporated herein by reference.

TECHNICAL FIELD

The present disclosure relates to a tire management system and a tire management method.

BACKGROUND ART

There is known a system that, when it is determined that a pneumatic tire (hereinafter, merely referred to as "tire") attached to a vehicle such as an automobile is punctured, issues an alert indicating that the tire is punctured (see PTL 1).

CITATION LIST

Patent Literature

[PTL 1] Japanese Patent Application Publication No. 2019-6266

SUMMARY OF THE INVENTION

Problems to be Solved by the Invention

Meanwhile, there might be considered a system that, each time the vehicle visits a predetermined place such as a service station, acquires information regarding the state of tires attached to the vehicle. Such a system would make it possible to perform an abnormality diagnosis of the tires based on the acquired information, and notify the user or the like of the diagnosis result. In addition, it would be possible to attract the user to the predetermined place by granting a privilege such as a coupon to the user based on the acquired information. However, there has been no such conventional system.

It is therefore an object of the present disclosure to provide a tire management system and a tire management method that can acquire information regarding the state of a tire of a vehicle that has visited a predetermined place.

Solution to the Problems

A tire management system according to an aspect of the present disclosure includes an information acquisition portion and a storage processing portion. The information acquisition portion acquires state information regarding a state of a pneumatic tire attached to a vehicle when the vehicle is located in a predetermined specific range. The storage processing portion stores, into a predetermined storage portion, the state information acquired by the information acquisition portion.

With the above-described configuration, it is possible to acquire information regarding the state of a tire of a vehicle that has visited a predetermined place.

Advantageous Effects of the Invention

According to the present disclosure, it is possible to acquire information regarding the state of a tire of a vehicle that has visited a predetermined place.

DESCRIPTION OF EMBODIMENTS

The following describes embodiments of the present disclosure with reference to the accompanying drawings. It should be noted that the following embodiments are examples of specific embodiments of the present disclosure and should not limit the technical scope of the present disclosure.

First Embodiment

Figure 1:
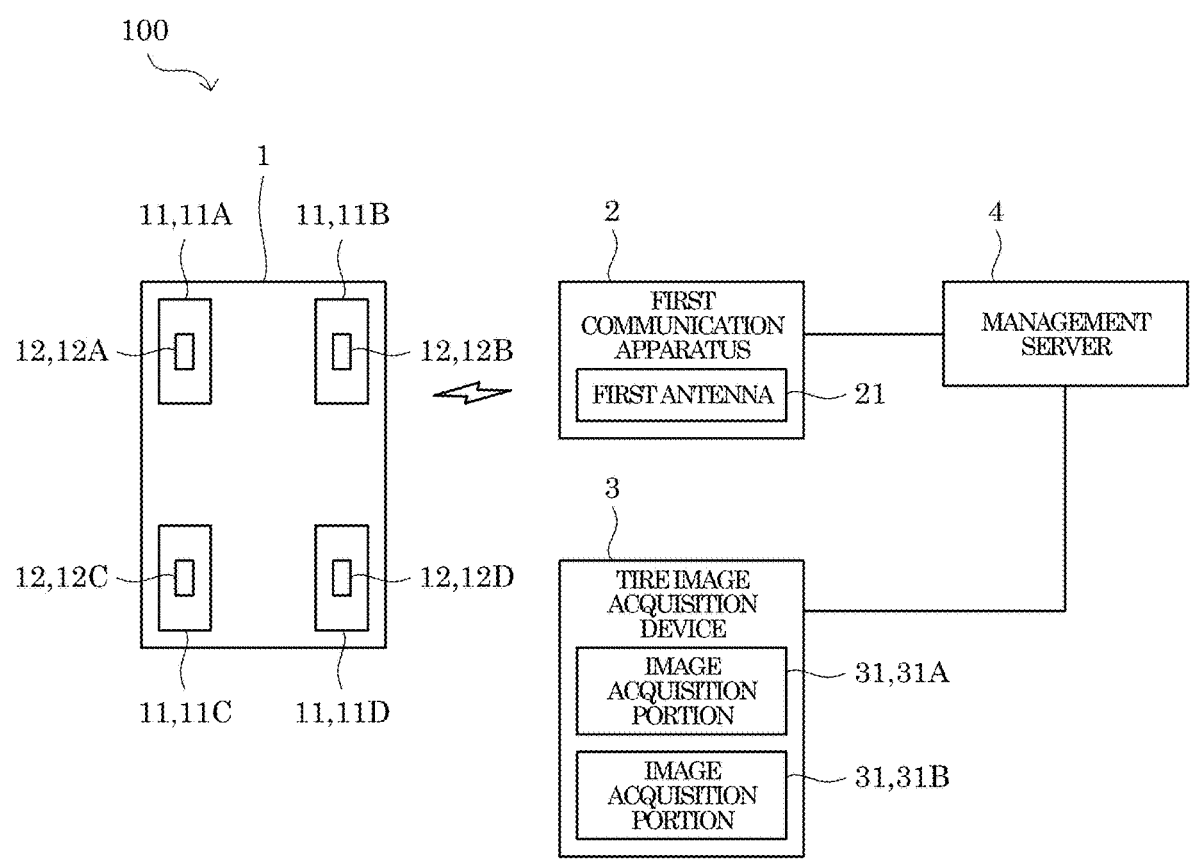
FIG. 1 is a diagram showing a configuration of a tire management system according to a first embodiment of the present disclosure.

First, with reference to FIG. 1, a description is given of a configuration of a tire management system 100 according to a first embodiment of the present disclosure.

As shown in FIG. 1, the tire management system 100 includes a vehicle 1, a first communication apparatus 2, a tire image acquisition device 3, and a management server 4.

In the tire management system 100, the management server 4 is connected so as to mutually communicate with the first communication apparatus 2 and the tire image acquisition device 3 via a communication network such as the Internet or a LAN (Local Area Network).

The vehicle 1 is an automobile to which pneumatic tires (hereinafter, merely referred to as "tires") 11 that are a management object in the tire management system 100, are attached. For example, the vehicle 1 is a passenger car or a business vehicle.

As shown in FIG. 1, the vehicle 1 includes four tires 11. Of the four tires 11, a tire 11A is attached to a front-left wheel of the vehicle 1. In addition, a tire 11B is attached to a front-right wheel of the vehicle 1. In addition, a tire 11C is attached to a rear-left wheel of the vehicle 1. In addition, a tire 11D is attached to a rear-right wheel of the vehicle 1.

As shown in FIG. 1, the vehicle 1 includes four air pressure detection devices 12. Of the four air pressure detection devices 12, an air pressure detection device 12A is provided in the tire 11A. In addition, an air pressure detection device 12B is provided in the tire 11B. In addition, an air pressure detection device 12C is provided in the tire 11C. In addition, an air pressure detection device 12D is provided in the tire 11D.

Each of the air pressure detection devices 12 includes a detection portion that detects an air pressure and an air temperature in the tire 11 in which that air pressure detection device 12 is provided. The detection portion includes a pressure sensor and a temperature sensor.

In addition, each of the air pressure detection devices 12 includes a communication portion that is used to perform a wireless communication with an external communication apparatus. The communication portion includes a transmitter and an antenna.

Specifically, the air pressure detection device 12 executes a wireless communication according to a predetermined first wireless communication standard, with the first communication apparatus 2 (see FIG. 1) that is located in a communication range of the first wireless communication standard from the air pressure detection device 12. For example, the first wireless communication standard is IEEE that is well known as an international standard, or a wireless communication standard conforming to IEEE. For example, the first wireless communication standard is Bluetooth or Wi-Fi. In this case, the air pressure detection device 12 can execute wireless communication with the first communication apparatus 2 that is located in a range of over ten meters. It is noted that the first wireless communication standard may be a standard that is different from Bluetooth and Wi-Fi.

The air pressure detection device 12 transmits, to the first communication apparatus 2, air pressure data that includes detection results of the detection portion. The air pressure data includes detection device identification information, air pressure information, air temperature information and the like, wherein the detection device identification information is used to identify the air pressure detection device 12, the air pressure information indicates the air pressure inside the tire 11 detected by the detection portion, and the air temperature information indicates the air temperature inside the tire 11 detected by the detection portion. The air pressure information and the air temperature information are each a type of state information that is information regarding the state of the tires 11 attached to the vehicle 1.

For example, the air pressure detection device 12, when it can execute a wireless communication according to the first wireless communication standard with the first communication apparatus 2, executes a detection process and a transmission process at a predetermined execution cycle. In the detection process, the air pressure and the air temperature of the tire 11 are detected by using the detection portion. In the transmission process, the air pressure data that includes the detection results of the detection process is transmitted to the first communication apparatus 2. For example, the execution cycle is an arbitrarily determined time between 10 (ten) seconds and 10 (ten) minutes. It is noted that the air pressure detection device 12 may execute the detection process and the transmission process upon receiving an execution instruction transmitted from the management server 4 via the first communication apparatus 2.

The first communication apparatus 2 receives the air pressure data transmitted from the air pressure detection devices 12 and transmits the received air pressure data to the management server 4.

For example, the first communication apparatus 2 is installed at a gas station, such as a gasoline stand or a service station. It is noted that the first communication apparatus 2 may be installed at a parking lot of a commercial facility such as a shopping mall, a rental parking lot such as a coin-parking lot, a parking area of a highway, a service area of a highway, an automobile dealer, and an automobile garage.

As shown in FIG. 1, the first communication apparatus 2 includes a first antenna 21. The first antenna 21 is used for wireless communication with the air pressure detection devices 12. The first communication apparatus 2 executes a wireless communication according to the first wireless communication standard with the air pressure detection device 12 that is located in a communication range of the first wireless communication standard from the first antenna 21. The first antenna 21 is installed such that at least a refueling place in the gas station is located in the communication range of the wireless communication according to the first wireless communication standard.

The first communication apparatus 2 acquires the air pressure information and the air temperature information transmitted from the air pressure detection device 12 when the vehicle 1 is located in the communication range of the wireless communication according to the first wireless communication standard. The first communication apparatus 2 is an example of an information acquisition portion of the present disclosure. In addition, the communication range of the wireless communication performed by the first communication apparatus 2 according to the first wireless communication standard is an example of a specific range of the present disclosure. In addition, the process of acquiring the air pressure information and the air temperature information executed by the first communication apparatus 2 is an example of an acquisition step of the present disclosure.

Upon receiving the air pressure data from an air pressure detection device 12, the first communication apparatus 2 adds first additional data to the received air pressure data. Subsequently, the first communication apparatus 2 transmits the air pressure data added with the first additional data to the management server 4. The first additional data includes: reception date/time information indicating the date and the time at which the air pressure data was received; and communication apparatus identification information that is used for identifying the first communication apparatus 2.

The tire image acquisition device 3 acquires a tire image that shows the state of a ground-contact surface of the tire 11. The tire image is a type of the state information regarding the state of the tires 11 attached to the vehicle 1.

For example, the tire image acquisition device 3 is, as is the case with the first communication apparatus 2, installed at the gas station. It is noted that the tire image acquisition device 3 may be, as is the case with the first communication apparatus 2, installed at a parking lot of a commercial facility such as a shopping mall, a rental parking lot such as a coin-parking lot, a parking area of a highway, a service area of a highway, an automobile dealer, and an automobile garage.

For example, the tire image acquisition device 3 includes a pair of image acquisition portions 31 shown in FIG. 1. The pair of image acquisition portions 31 are installed on the ground surface of the gas station. An image acquisition portion 31A, one of the pair of image acquisition portions 31, comes in contact with the tires 11 on the left side of the vehicle 1. An image acquisition portion 31B, the other of the pair of image acquisition portions 31, comes in contact with the tires 11 on the right side of the vehicle 1. For example, each of the pair of image acquisition portions 31 includes: a first slope portion that guides the tires 11 to a photographing surface located higher than the ground surface; a photographing portion that photographs, from below the photographing surface, the ground-contact surfaces of the tires 11 rolling on the photographing surface; and a second slope portion that guides the tires 11 from the photographing surface to the ground surface.

In addition, the tire image acquisition device 3 includes a vehicle sensor that detects the vehicle 1 at an upstream of an installment position of the pair of image acquisition portions 31 in the traveling path of the vehicle 1 that passes the installment position. When the vehicle sensor has detected the vehicle 1, the tire image acquisition device 3 acquires four tire images corresponding respectively to the four tires 11 by using the pair of image acquisition portions 31. In addition, the tire image acquisition device 3 includes a camera that photographs the number plate of the vehicle 1 that passes the installment position.

The tire image acquisition device 3 acquires the tire images of the tires 11 when the tires 11 of the vehicle 1 are located in a photographing range of the tire images photographed by the pair of image acquisition portions 31. The tire image acquisition device 3 is another example of the information acquisition portion of the present disclosure. In addition, the photographing range of the tire images photographed by the pair of image acquisition portions 31 is another example of the specific range of the present disclosure. In addition, the process of acquiring the tire images performed by the tire image acquisition device 3 is another example of the acquisition step of the present disclosure.

When the tire images corresponding to the tires 11 have been acquired, the tire image acquisition device 3 transmits tire image data corresponding to the tires 11 to the management server 4. The tire image data includes an automobile registration number of the vehicle 1 read from the photograph image of the camera, attachment position information indicating attachment positions of the tires 11 in the vehicle 1, and the tire images. In addition, the tire image data includes: photographing date/time information indicating the date and the time at which the tire images were photographed; and acquisition device identification information used for identifying the tire image acquisition device 3.

The management server 4 executes, based on the air pressure data and the tire image data, various processes regarding the management of the tires 11.

[Configuration of Management Server 4]

Next, a configuration of the management server 4 is described with reference to FIG. 2.

Figure 2:
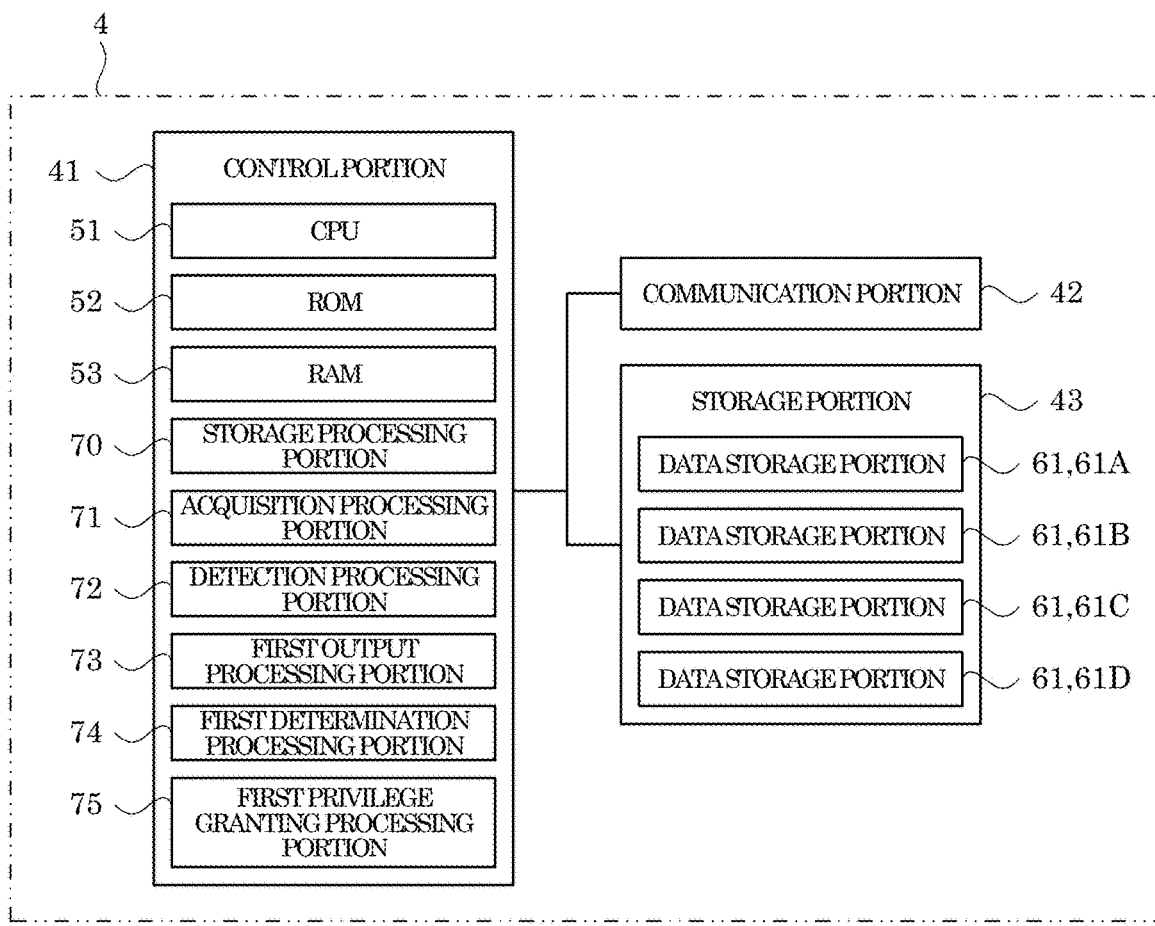
FIG. 2 is a diagram showing a configuration of a management server of the tire management system according to the first embodiment of the present disclosure.

As shown in FIG. 2, the management server 4 includes a control portion 41, a communication portion 42, and a storage portion 43.

The control portion 41 comprehensively controls the management server 4. As shown in FIG. 2, the control portion 41 includes a CPU 51, a ROM 52, and a RAM 53. The CPU 51 is a processor that executes various types of calculation processes. The ROM 52 is a nonvolatile storage device in which are preliminarily stored various types of information such as control programs for causing the CPU 51 to execute various processes. The RAM 53 is a volatile or nonvolatile storage device that is used as a temporary storage memory (working area) for the various types of processes executed by the CPU 51. In the control portion 41, the CPU 51 executes the various types of control programs that are preliminarily stored in the ROM 52. This allows the control portion 41 to comprehensively control the management server 4.

The communication portion 42 is a communication interface configured to perform wired or wireless data communication with external communication apparatuses such as the first communication apparatus 2, via the communication network.

The storage portion 43 is a nonvolatile storage device. For example, the storage portion 43 is a storage device such as: a nonvolatile memory such as a flash memory or an EEPROM; an SSD (Solid State Drive); or an HDD (Hard Disk Drive).

In the storage portion 43, vehicle information for each vehicle 1 is preliminarily stored. The vehicle information is information regarding the vehicle 1. The vehicle information includes: vehicle identification information used for identifying the vehicle 1; the automobile registration number of the vehicle 1; information such as a type, a color, and a size of the vehicle 1; the detection device identification information of the air pressure detection devices 12 respectively corresponding to the tires 11 attached to the vehicle 1; user identification information used for identifying a user corresponding to the vehicle 1; and tire information of the tires 11 attached to the vehicle 1. The tire information is information regarding the tires 11. The tire information includes a type, a size, and a manufacture timing of each of the tires 11.

In addition, the storage portion 43 preliminarily stores user information corresponding to each user. The user information is information regarding each user. The user information includes: authentication information that is used for the user to log in the management server 4; information such as name, sex, age, date of birth, address, and telephone number of the user; and an electronic mail address of the user. The authentication information includes the user identification information and a password.

In addition, as shown in FIG. 2, the storage portion 43 includes four data storage portions 61. The four data storage portions 61 are provided for each piece of the vehicle identification information preliminarily registered in the management server 4.

Of the four data storage portions 61, a data storage portion 61A is a storage area of the storage portion 43 that is used to store the air pressure data and the tire image data corresponding to the tire 11A. In addition, a data storage portion 61B is a storage area of the storage portion 43 that is used to store the air pressure data and the tire image data corresponding to the tire 11B. In addition, a data storage portion 61C is a storage area of the storage portion 43 that is used to store the air pressure data and the tire image data corresponding to the tire 11C. In addition, a data storage portion 61D is a storage area of the storage portion 43 that is used to store the air pressure data and the tire image data corresponding to the tire 11D.

Here, according to the tire management system 100 of the first embodiment of the present disclosure, when an abnormality has occurred in the tire 11, it is possible to urge coping with the abnormality.

Specifically, as shown in FIG. 2, the control portion 41 includes a storage processing portion 70, an acquisition processing portion 71, a detection processing portion 72, a first output processing portion 73, a first determination processing portion 74, and a first privilege granting processing portion 75. For example, the control portion 41 functions as the storage processing portion 70, the acquisition processing portion 71, the detection processing portion 72, the first output processing portion 73, the first determination processing portion 74, and the first privilege granting processing portion 75 by executing a tire management program preliminarily stored in the storage portion 43. It is noted that a part or all of processing portions included in the control portion 41 may be composed of an electronic circuit. In addition, the tire management program may be a program for causing a plurality of processors to function as the various types of processing portions.

The storage processing portion 70 stores, into the storage portion 43, the state information acquired by the first communication apparatus 2 and the tire image acquisition device 3. The process of storing the state information executed by the storage processing portion 70 is an example of a storage step of the present disclosure.

Specifically, upon receiving the air pressure data transmitted from the first communication apparatus 2, the storage processing portion 70 determines a storage destination of the received air pressure data. Here, the storage processing portion 70 determines one of the data storage portions 61 as the storage destination of the air pressure data based on the detection device identification information included in the received air pressure data and the vehicle information stored in the storage portion 43. Subsequently, the storage processing portion 70 stores the received air pressure data in the data storage portion 61 determined as the storage destination.

In addition, upon receiving the tire image data transmitted from the tire image acquisition device 3, the storage processing portion 70 determines a storage destination of the received tire image data. Here, the storage processing portion 70 determines one of the data storage portions 61 as the storage destination of the tire image data based on the automobile registration number included in the received tire image data and the vehicle information stored in the storage portion 43. Subsequently, the storage processing portion 70 stores the received tire image data in the data storage portion 61 determined as the storage destination.

It is noted that the tire images included in the tire image data may be photographed by a camera of a mobile terminal such as a smartphone associated with the user, and transmitted from the mobile terminal to the management server 4.

Upon arrival of a predetermined acquisition timing, the acquisition processing portion 71 acquires the state information regarding the state of the tires 11 attached to the vehicle 1.

For example, the acquisition timing is a timing when a new piece of air pressure data or a new piece of tire image data is stored in the data storage portion 61. It is noted that the acquisition timing may arrive at a predetermined cycle. In addition, the acquisition timing may be when an instruction to acquire the state information is input to the management server 4 via an information processing apparatus such as a personal computer communicably connected to the management server 4.

For example, when the air pressure data or the tire image data of a vehicle 1 has been stored in the data storage portion 61, the acquisition processing portion 71 acquires the state information for each of the four tires 11 of the vehicle 1. For example, the acquisition processing portion 71 acquires a plurality of pieces of air pressure data selected in order from a piece of air pressure data added with the latest piece of reception date/time information, from each of the data storage portions 61 corresponding to the tires 11. In addition, the acquisition processing portion 71 acquires, from each of the data storage portions 61 corresponding to the tires 11, the tire image data including the latest piece of photographing date/time information. It is noted that the acquisition processing portion 71 may acquire the state information for one or more of the four tires 11.

It is noted that the acquisition processing portion 71 may acquire the air pressure data by transmitting the execution instruction to the air pressure detection devices 12 of the vehicle 1 via the first communication apparatus 2.

The detection processing portion 72 detects the abnormality of the tire 11 based on the state information acquired by the acquisition processing portion 71.

For example, the abnormality includes a first abnormality where the air pressure of the tire 11 is out of a predetermined first reference range. In addition, the abnormality includes a second abnormality where a decrease speed of the air pressure of the tire 11 exceeds a reference speed. In addition, the abnormality includes a third abnormality where a difference in wear amount between a part of the ground-contact surface of the tire 11 and another part exceeds a first reference amount. In addition, the abnormality includes a fourth abnormality where the wear amount of the ground-contact surface of the tire 11 exceeds a second reference amount. In addition, the abnormality includes a fifth abnormality where a flaw whose depth exceeds a predetermined depth is formed on the ground-contact surface of the tire 11.

The detection processing portion 72 determines whether or not the first abnormality is present based on the latest piece of air pressure data acquired by the acquisition processing portion 71. For example, the detection processing portion 72 determines that the first abnormality is present when the air pressure information corrected based on the air temperature information is out of the first reference range.

In addition, the detection processing portion 72 determines whether or not the second abnormality is present based on the plurality of pieces of air pressure data acquired by the acquisition processing portion 71. Specifically, the detection processing portion 72 determines that the second abnormality is present when the decrease speed of the air pressure of the tire 11 calculated based on the plurality of pieces of air pressure data exceeds the reference speed.

In addition, the detection processing portion 72 determines whether or not the third abnormality, the fourth abnormality, or the fifth abnormality is present based on the latest piece of tire image data acquired by the acquisition processing portion 71.

For example, the detection processing portion 72 detects the abnormality for each of the four tires 11 of the vehicle 1. It is noted that the detection processing portion 72 may detect the abnormality for one or more of the four tires 11.

When the detection processing portion 72 has detected the abnormality, the first output processing portion 73 outputs guide information to an output destination corresponding to the vehicle 1, wherein the guide information is used to guide to an office where a maintenance service corresponding to the abnormality is provided.

In the tire management system 100, the guide information is coupon information that is used to reduce the fee for the maintenance service.

For example, the maintenance service includes: an air pressure adjustment service to adjust the air pressure of the tire 11; a rotation service to replace the attachment positions of the four tires 11; and a tire replacement service to replace the tire 11.

The maintenance service corresponding to the first abnormality is the air pressure adjustment service. In addition, the maintenance service corresponding to the third abnormality is the rotation service. In addition, the maintenance service corresponding to the second abnormality, the fourth abnormality, and the fifth abnormality is the tire replacement service.

For example, the office includes the gas station, an automobile dealer, and an automobile garage.

For example, when the detection processing portion 72 has detected the abnormality, the first output processing portion 73 transmits an electronic mail including a message that the abnormality has been detected and the coupon information, to an electronic mail address of the user corresponding to the vehicle 1. This motivates the user to drive the vehicle 1 to the office.

It is noted that when the user has logged in the management server 4 by using a terminal apparatus such as a smartphone, the first output processing portion 73 may output the coupon information to a display portion of the terminal apparatus.

After the guide information is output, the first determination processing portion 74 determines whether or not the maintenance service was provided.

For example, the first determination processing portion 74 determines whether or not the maintenance service was provided, based on the state information that is acquired by the acquisition processing portion 71 before a predetermined determination time elapses after the output of the guide information. For example, the determination time is an arbitrarily determined time between one hour and 24 hours.

Specifically, the first determination processing portion 74 determines that the air pressure adjustment service was provided when it is determined that the first abnormality is not present based on the air pressure data that was acquired after the first abnormality had been detected by the detection processing portion 72.

In addition, the first determination processing portion 74 determines that the tire replacement service was provided when it is determined that the second abnormality is not present based on the air pressure data that was acquired after the second abnormality had been detected by the detection processing portion 72.

In addition, the first determination processing portion 74 determines that the rotation service was provided when it is determined that attachment positions of the tires 11 have been changed based on the tire image data acquired after the third abnormality had been detected by the detection processing portion 72.

In addition, the first determination processing portion 74 determines that the tire replacement service was provided when it is determined that the fourth abnormality or the fifth abnormality is not present based on the tire image data that was acquired after the fourth abnormality or the fifth abnormality had been detected by the detection processing portion 72.

It is noted that the first determination processing portion 74 may determine whether or not the maintenance service was provided, based on whether or not first provision information that includes an indication that the maintenance service was provided, has been input to the management server 4. For example, the first determination processing portion 74 may determine that the maintenance service was provided, when the first provision information has been input via the information processing apparatus.

When the first determination processing portion 74 has determined that the maintenance service was provided, the first privilege granting processing portion 75 grants a predetermined first privilege to the user corresponding to the vehicle 1.

For example, the first privilege is a discount coupon that is used to reduce a fee regarding an automobile, such as a fee for gasoline or a fee for an automobile accessory. It is noted that the first privilege may be a point(s) of a point service provided by the maker of the tires 11, the maker of the vehicle 1, the manager of the gas station, or the like. In this case, the user information may include point information that indicates the number of points owned by the user. In addition, the first privilege granting processing portion 75 may grant the point(s) to the user by rewriting the point information. In addition, the first privilege is not limited to the discount coupon or the point(s), but may be any economic benefits or right that is granted to the user.

For example, the first privilege granting processing portion 75 transmit an electronic mail including the discount coupon to the electronic mail address of the user corresponding to the vehicle 1. This motivates the user to receive provision of the maintenance service.

It is noted that when the user has logged in the management server 4 by using a terminal apparatus such as a smartphone, the first privilege granting processing portion 75 may display the discount coupon on the display portion of the terminal apparatus.

[First Tire Management Process]

Figure 3:
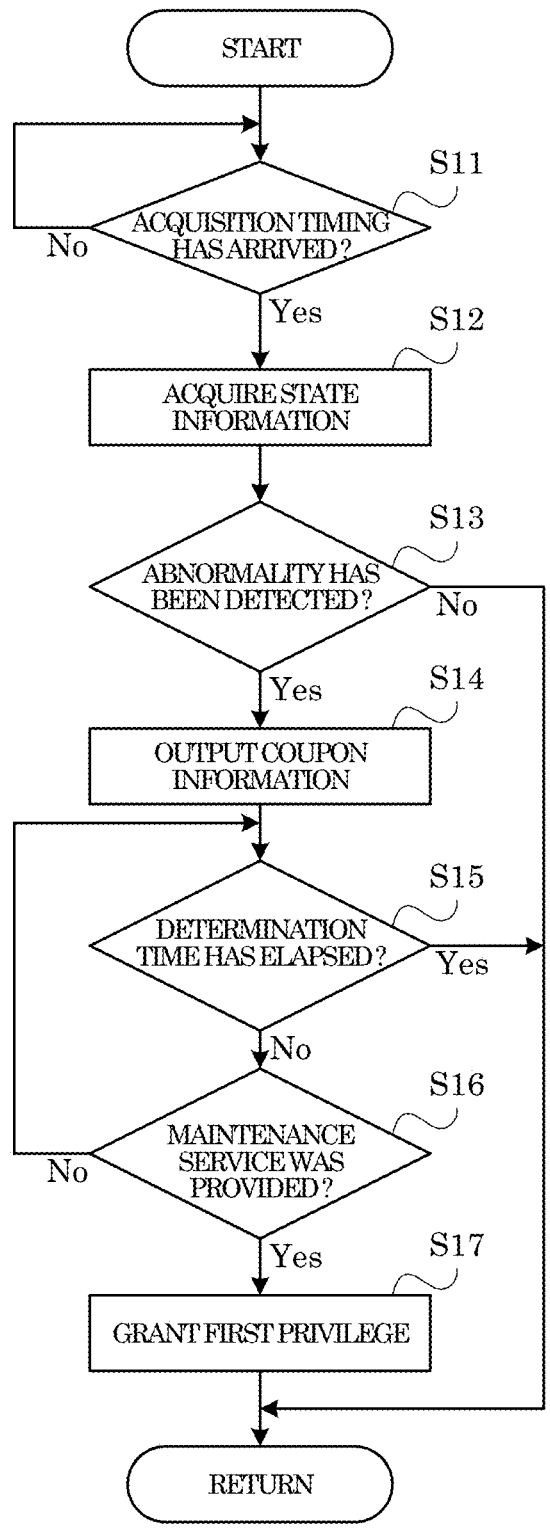
FIG. 3 is a flowchart showing an example of a first tire management process executed by the management server of the tire management system according to the first embodiment of the present disclosure.

In the following, with reference to FIG. 3, a description is given of an example of the procedure of a first tire management process executed by the control portion 41 of the management server 4 in the tire management system 100. Here, steps S11, S12, . . . represent numbers assigned to the processing procedures (steps) executed by the control portion 41.

<Step S11>

First, in step S11, the control portion 41 determines whether or not the acquisition timing has arrived. Here, the process of step S11 is executed by the acquisition processing portion 71 of the control portion 41.

Here, upon determining that the acquisition timing has arrived (Yes side at step S11), the control portion 41 moves the process to step S12. In addition, upon determining that the acquisition timing has not arrived (No side at step S11), the control portion 41 waits, at step S11, for the acquisition timing to arrive.

<Step S12>

In step S12, the control portion 41 acquires the state information. Here, the process of step S12 is executed by the acquisition processing portion 71 of the control portion 41.

<Step S13>

In step S13, the control portion 41 determines whether or not the abnormality has been detected, based on the state information acquired in step S12. Here, the process of step S13 is executed by the detection processing portion 72 of the control portion 41.

Here, upon determining that the abnormality has been detected (Yes side at step S13), the control portion 41 moves the process to step S14. In addition, upon determining that the abnormality has not been detected (No side at step S13), the control portion 41 moves the process to step S11.

<Step S14>

In step S14, the control portion 41 outputs the coupon information to the output destination corresponding to the vehicle 1. Here, the process of step S14 is executed by the first output processing portion 73 of the control portion 41.

<Step S15>

In step S15, the control portion 41 determines whether or not the determination time has elapsed since the execution of the process of step S14.

Here, upon determining that the determination time has elapsed (Yes side at step S15), the control portion 41 moves the process to step S11. In addition, upon determining that the determination time has not elapsed (No side at step S15), the control portion 41 moves the process to step S16.

<Step S16>

In step S16, the control portion 41 determines whether or not a maintenance service corresponding to the abnormality detected in step S13 was provided. Here, the process of step S16 is executed by the first determination processing portion 74 of the control portion 41.

Here, upon determining that the maintenance service was provided (Yes side at step S16), the control portion 41 moves the process to step S17. In addition, upon determining that the maintenance service has not been provided (No side at step S16), the control portion 41 moves the process to step S15.

<Step S17>

In step S17, the control portion 41 grants the first privilege to the user corresponding to the vehicle 1. Here, the process of step S17 is executed by the first privilege granting processing portion 75 of the control portion 41.

As described above, in the tire management system 100, the state information regarding the state of the tire 11 attached to the vehicle 1 is acquired, and the abnormality of the tire 11 is detected based on the acquired state information. In addition, when the abnormality has been detected, the guide information that is used for guiding to an office where a maintenance service corresponding to the abnormality is provided, is output to the output destination corresponding to the vehicle 1. This makes it possible to, when the abnormality has been detected, transmit the guide information to the driver of the vehicle 1 or the like. It is thus possible to urge the driver or the like to cope with the abnormality.

In addition, in the tire management system 100, the guide information is the coupon information that is used to reduce the fee for the maintenance service. This motivates the driver of the vehicle 1 or the like to move to the office. It is thus possible to guide the vehicle 1 to the office.

In addition, in the tire management system 100, after the coupon information is output, it is determined whether or not the maintenance service was provided. Subsequently, when it is determined that the maintenance service was provided, the first privilege is granted to the user corresponding to the vehicle 1. This motivates the driver of the vehicle 1 or the like to receive provision of the maintenance service. It is thus possible to strongly urge the driver or the like to cope with the abnormality.

In addition, in the tire management system 100, it is determined whether or not the maintenance service was provided, based on the state information that is acquired after the coupon information is output. This makes it possible to automatically determine whether or not the maintenance service was provided. Accordingly, compared with a configuration where information for the determination is input manually, it is possible to eliminate the time and effort to input the information.

Second Embodiment

Figure 4:
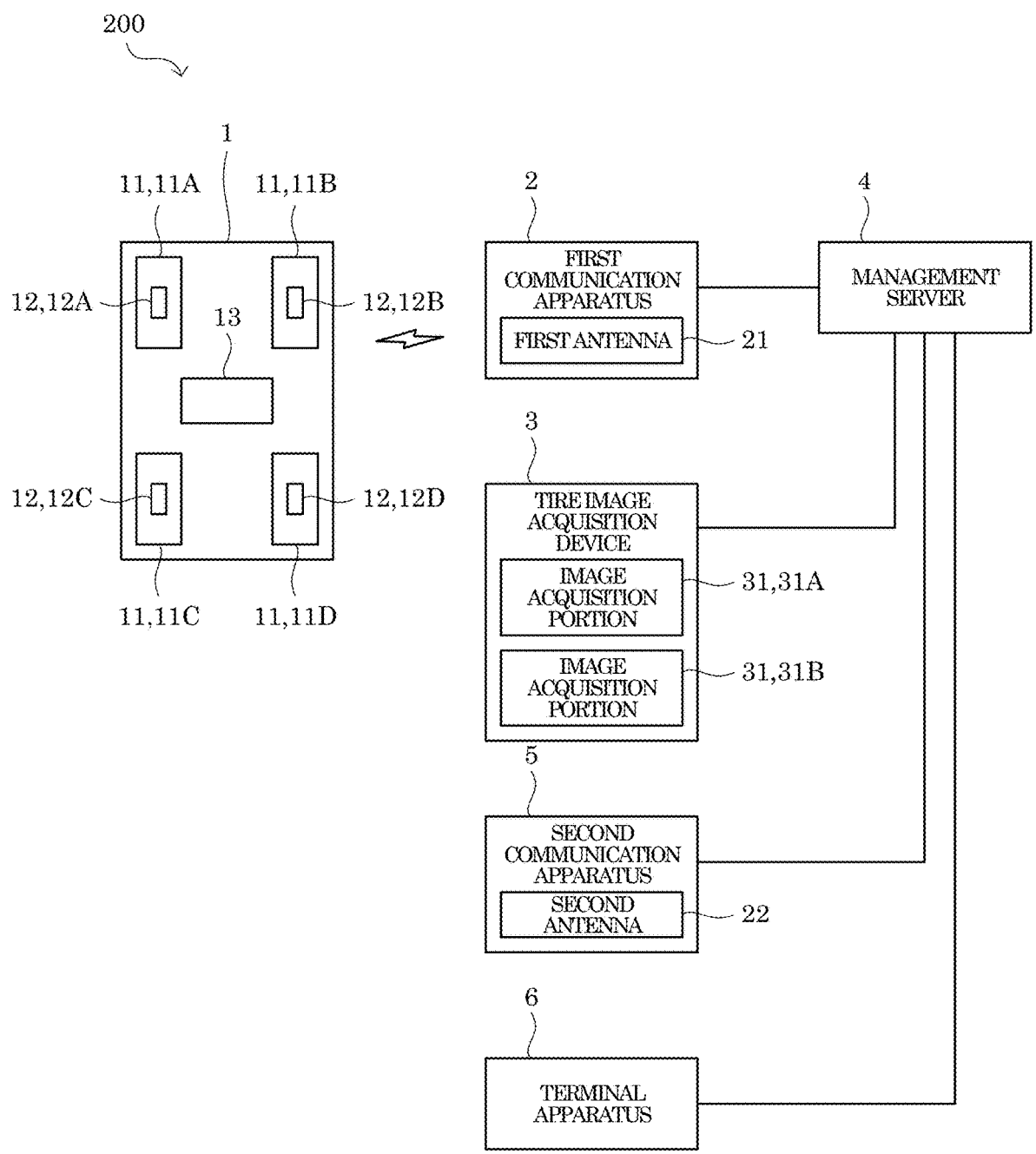
FIG. 4 is a diagram showing a configuration of a tire management system according to a second embodiment of the present disclosure.
Figure 5:
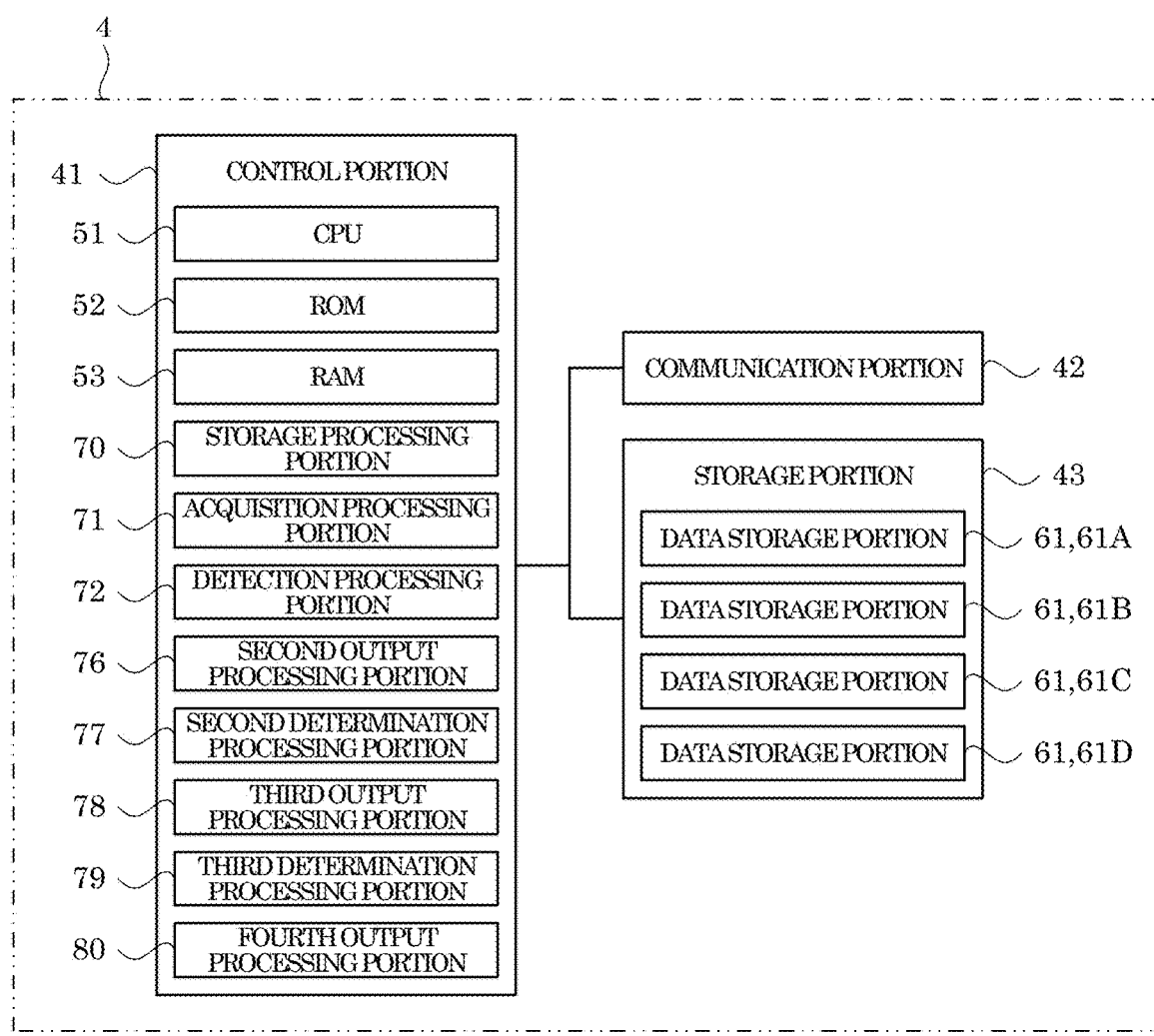
FIG. 5 is a diagram showing a configuration of a management server of the tire management system according to the second embodiment of the present disclosure.

Next, with reference to FIG. 4 and FIG. 5, a description is given of a configuration of a tire management system 200 according to a second embodiment of the present disclosure.

As shown in FIG. 4, the tire management system 200 includes the vehicle 1, the first communication apparatus 2, the tire image acquisition device 3, the management server 4, a second communication apparatus 5, and a terminal apparatus 6. In the tire management system 200, the management server 4 is connected so as to mutually communicate with the first communication apparatus 2, the tire image acquisition device 3, the second communication apparatus 5, and the terminal apparatus 6. It is noted that the first communication apparatus 2 and the tire image acquisition device 3 have the same configuration as those of the tire management system 100.

The vehicle 1 has the same configuration as the vehicle 1 of the tire management system 100 except that it includes a vehicle-mounted communication apparatus 13 shown in FIG. 4. In the following, only configurations different from those of the vehicle 1 of the tire management system 100 are described.

The vehicle-mounted communication apparatus 13 receives the air pressure data transmitted from the air pressure detection devices 12. Specifically, the vehicle-mounted communication apparatus 13 executes wireless communications according to the first wireless communication standard with the air pressure detection devices 12 and receives the air pressure data transmitted from the air pressure detection devices 12.

In the tire management system 200, the air pressure detection devices 12 and the vehicle-mounted communication apparatus 13 are both provided in the vehicle 1. Thus the air pressure detection devices 12 can always communicate with the vehicle-mounted communication apparatus 13. The air pressure detection devices 12 execute the detection process and the transmission process at the execution cycle.

In addition, the vehicle-mounted communication apparatus 13 acquires position information that indicates the current position of the vehicle 1. For example, the vehicle-mounted communication apparatus 13 is provided with a GPS receiver that receives radio waves transmitted from a GPS satellite. The vehicle-mounted communication apparatus 13 acquires the position information based on information that is included in the radio waves received by the GPS receiver.

In addition, the vehicle-mounted communication apparatus 13 transmits the received air pressure data to the second communication apparatus 5. For example, the vehicle-mounted communication apparatus 13 executes a wireless communication according to a predetermined second wireless communication standard, with the second communication apparatus 5 (see FIG. 4) that is located in a communication range of the second wireless communication standard from the vehicle-mounted communication apparatus 13. For example, the second wireless communication standard is LTE. In this case, the vehicle-mounted communication apparatus 13 can execute wireless communication with the second communication apparatus 5 that is located in a range of several kilometers. It is noted that the second wireless communication standard may be different from LTE.

The vehicle-mounted communication apparatus 13, upon receiving the air pressure data from the air pressure detection device 12, adds second additional data to the received air pressure data. Subsequently, the vehicle-mounted communication apparatus 13 transmits the air pressure data added with the second additional data to the second communication apparatus 5. The second additional data includes the position information and reception date/time information indicating the date and the time at which the air pressure data was received.

In addition, the vehicle-mounted communication apparatus 13 includes a display portion that is used to display information output from the management server 4.

It is noted that the vehicle-mounted communication apparatus 13 may stop performing communication with the air pressure detection devices 12 while the vehicle 1 is located in the communication range of the wireless communication performed by the first communication apparatus 2 according to the first wireless communication standard. In this case, the vehicle-mounted communication apparatus 13 may transmit the position information at the same cycle as the execution cycle. In addition, the vehicle-mounted communication apparatus 13 may not have a function to perform communication with the air pressure detection devices 12.

The second communication apparatus 5 receives the air pressure data transmitted from the vehicle-mounted communication apparatus 13 and transmits the received air pressure data to the management server 4. The second communication apparatus 5 may be disposed at an arbitrary position.

As shown in FIG. 4, the second communication apparatus 5 includes a second antenna 22. The second antenna 22 is used for a wireless communication with the vehicle-mounted communication apparatus 13. The second communication apparatus 5 executes the wireless communication according to the second wireless communication standard, with the vehicle-mounted communication apparatus 13 that is located in a communication range of the second wireless communication standard from the second antenna 22.

The second communication apparatus 5, upon receiving the air pressure data or the position information from the vehicle-mounted communication apparatus 13, transmits the received air pressure data or position information to the management server 4. The second communication apparatus 5 is another example of the information acquisition portion of the present disclosure. In addition, the communication range of the wireless communication performed by the second communication apparatus 5 according to the second wireless communication standard is another example of the specific range of the present disclosure.

The terminal apparatus 6 is an information processing apparatus that is used by employees of the office. For example, the terminal apparatus 6 is a personal computer installed at the office. It is noted that the terminal apparatus 6 may be a smartphone, a tablet terminal or the like used by the employees of the office.

The management server 4 has the same configuration as the management server 4 of the tire management system 100 except that the storage content of the storage portion 43 has been added and that it includes a second output processing portion 76, a second determination processing portion 77, a third output processing portion 78, a third determination processing portion 79, and a fourth output processing portion 80 shown in FIG. 5 in place of the first output processing portion 73, the first determination processing portion 74, and the first privilege granting processing portion 75. The following describes only configurations of the management server 4 different from those of the management server 4 of the tire management system 100.

In the storage portion 43, office information for each of the offices is preliminarily stored. The office information is information regarding each office. The office information includes: office identification information used for identifying the office; information such as the name, the location, and the telephone number of the office; and stock information of articles used for the maintenance service in the office. The article includes, for example, the tire 11 for replacement. In addition, the office information includes terminal apparatus identification information used for identifying the terminal apparatus 6.

When the detection processing portion 72 has detected the abnormality, the second output processing portion 76 outputs the guide information to an output destination corresponding to the vehicle 1.

In the tire management system 200, the guide information is route information that indicates a route to the location of a first office that is, among a plurality of offices, closest to the current position of the vehicle 1.

Specifically, the second output processing portion 76 determines the current position of the vehicle 1 based on the latest piece of position information stored in the data storage portions 61. In addition, the second output processing portion 76 determines one of the plurality of offices as the first office, based on the current position of the vehicle 1 and the office information.

For example, the route information is map information in which the route from the current position of the vehicle 1 to the location of the first office is identifiably displayed. It is noted that the route information may include voice information for guiding the vehicle 1 to the first office.

For example, when the detection processing portion 72 has detected the abnormality, the second output processing portion 76 outputs a message that the abnormality has been detected and the route information to the display portion of the vehicle-mounted communication apparatus 13. This makes it possible to indicate, to the driver of the vehicle 1, the route from the current position to the location of an office that is closest to the current position. It is noted that, when the detection processing portion 72 has detected the abnormality, the second output processing portion 76 may transmit an electronic mail including a message that the abnormality has been detected and the route information to the electronic mail address of the user corresponding to the vehicle 1.

After the second output processing portion 76 outputs the route information, the second determination processing portion 77 determines whether or not the vehicle 1 is moving according to the route information.

For example, the second determination processing portion 77 determines that the vehicle 1 is moving according to the route information when the movement of the vehicle 1 according to the route information has continued for over a predetermined time. It is noted that the second determination processing portion 77 may determine that the vehicle 1 is moving according to the route information when the distance traveled by the vehicle 1 according to the route information has exceeded a predetermined distance.

When the second output processing portion 76 outputs the route information, the third output processing portion 78 outputs first notification information that includes an indication of the fact, to an output destination corresponding to the first office.

Specifically, when the second determination processing portion 77 has determined that the vehicle 1 is moving according to the route information, the third output processing portion 78 outputs the first notification information to the output destination corresponding to the first office.

The first notification information includes: an indication that the route information has been output; information such as the type, the color, and the size of the vehicle 1; information indicating a type of the abnormality; the current position of the vehicle 1; and an expected arrival time of the vehicle 1.

When the second determination processing portion 77 has determined that the vehicle 1 is moving according to the route information, the third output processing portion 78 outputs the first notification information to a display portion of the terminal apparatus 6 corresponding to the first office.

It is noted that when the second output processing portion 76 outputs the route information, the third output processing portion 78 may immediately output the first notification information to the output destination corresponding to the first office.

In this case, the control portion 41 may not include the second determination processing portion 77.

When the second output processing portion 76 outputs the route information, the third determination processing portion 79 determines whether or not the article is present in the first office.

Specifically, when the maintenance service corresponding to the abnormality detected by the detection processing portion 72 is the tire replacement service, the third determination processing portion 79 determines whether or not the tire 11 necessary for the tire replacement service is in stock of the first office. The third determination processing portion 79 determines whether or not the tire 11 necessary for the tire replacement service is in stock of the first office, based on the type and size of the tire 11 for which the abnormality has been detected, and the office information corresponding to the first office.

When the third determination processing portion 79 has determined that the article is absent, the fourth output processing portion 80 outputs second notification information including an indication of the fact to an output destination corresponding to a second office that is, among the plurality of offices, closest to the location of the first office and has the article.

The second notification information includes: an indication that the third determination processing portion 79 has determined that the article is out of stock; information such as the name, the location, and the telephone number of the first office; and information for identifying the article that is absent.

The fourth output processing portion 80 determines one of the plurality of offices as the second office based on the office information.

Specifically, when the third output processing portion 78 outputs the first notification information, the fourth output processing portion 80 outputs the second notification information to a display portion of the terminal apparatus 6 corresponding to the second office.

[Second Tire Management Process]

Figure 6:
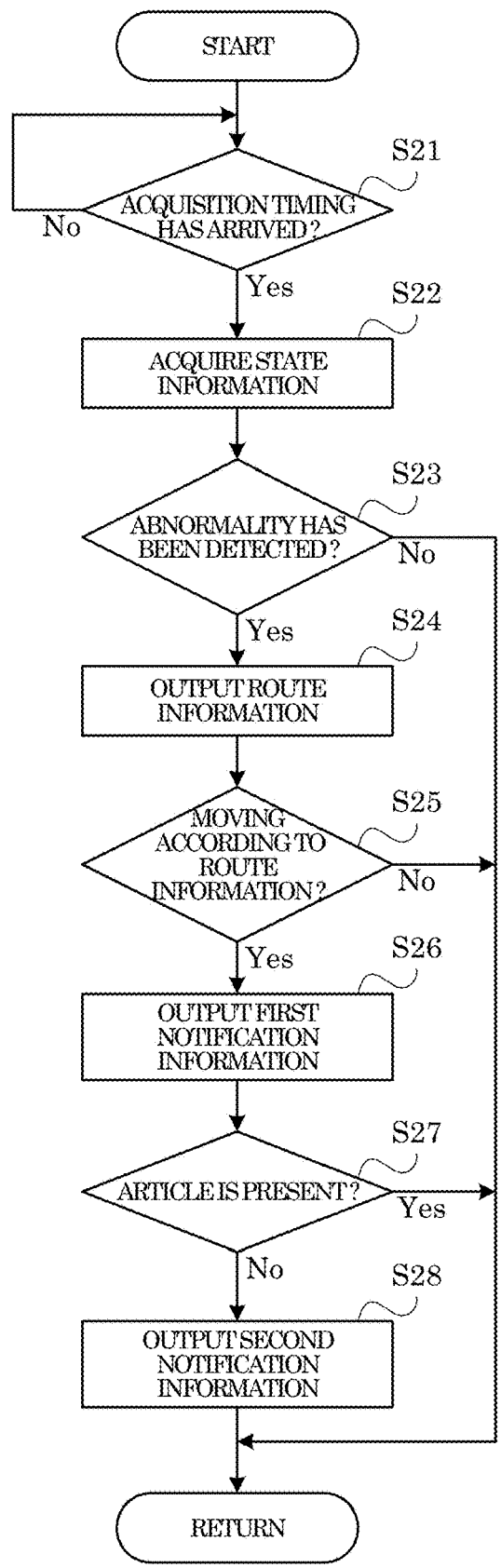
FIG. 6 is a flowchart showing an example of a second tire management process executed by the management server of the tire management system according to the second embodiment of the present disclosure.

In the following, with reference to FIG. 6, a description is given of an example of the procedure of a second tire management process executed by the control portion 41 of the management server 4 in the tire management system 200.

<Step S21>

First, in step S21, the control portion 41 determines whether or not the acquisition timing has arrived. Here, the process of step S21 is executed by the acquisition processing portion 71 of the control portion 41.

Here, upon determining that the acquisition timing has arrived (Yes side at step S21), the control portion 41 moves the process to step S22. In addition, upon determining that the acquisition timing has not arrived (No side at step S21), the control portion 41 waits, at step S21, for the acquisition timing to arrive.

<Step S22>

In step S22, the control portion 41 acquires the state information. Here, the process of step S22 is executed by the acquisition processing portion 71 of the control portion 41.

<Step S23>

In step S23, the control portion 41 determines whether or not the abnormality has been detected, based on the state information acquired in step S22. Here, the process of step S23 is executed by the detection processing portion 72 of the control portion 41.

Here, upon determining that the abnormality has been detected (Yes side at step S23), the control portion 41 moves the process to step S24. In addition, upon determining that the abnormality has not been detected (No side at step S23), the control portion 41 moves the process to step S21.

<Step S24>

In step S24, the control portion 41 outputs the route information to the output destination corresponding to the vehicle 1. Here, the process of step S24 is executed by the second output processing portion 76 of the control portion 41.

<Step S25>

In step S25, the control portion 41 determines whether or not the vehicle 1 is moving according to the route information output in step S24. Here, the process of step S25 is executed by the second determination processing portion 77 of the control portion 41.

Here, upon determining that the vehicle 1 is moving according to the route information (Yes side at step S25), the control portion 41 moves the process to step S26. In addition, upon determining that the vehicle 1 is not moving according to the route information (No side at step S25), the control portion 41 moves the process to step S21.

<Step S26>

In step S26, the control portion 41 outputs the first notification information to the output destination corresponding to the first office. Here, the process of step S26 is executed by the third output processing portion 78 of the control portion 41.

<Step S27>

In step S27, the control portion 41 determines whether or not the article is present in the first office. Here, the process of step S27 is executed by the third determination processing portion 79 of the control portion 41.

Here, upon determining that the article is present in the first office (Yes side at step S27), the control portion 41 moves the process to step S21. In addition, upon determining that the article is absent in the first office (No side at step S27), the control portion 41 moves the process to step S28.

<Step S28>

In step S28, the control portion 41 outputs the second notification information to the output destination corresponding to the second office. Here, the process of step S28 is executed by the fourth output processing portion 80 of the control portion 41.

As described above, in the tire management system 200, the state information regarding the state of the tires 11 attached to the vehicle 1 is acquired, and the abnormality of the tire 11 is detected based on the acquired state information. Subsequently, when the abnormality has been detected, the guide information that is used to guide to an office that can provide a maintenance service corresponding to the abnormality, is output to the output destination corresponding to the vehicle 1. This makes it possible to transmit the guide information to the driver of the vehicle 1 or the like when the abnormality has been detected. It is thus possible to urge the driver of the vehicle 1 or the like to cope with the abnormality.

In addition, in the tire management system 200, the guide information is the route information that indicates a route to the location of the first office that is, among the plurality of offices, closest to the current position of the vehicle 1. This makes it possible to indicate, to the driver of the vehicle 1 or the like, a route to the location of an office that is closest to the current position. It is thus possible to guide the vehicle 1 to the office.

In addition, in the tire management system 200, when the route information is output, the first notification information that includes an indication of the fact is output to an output destination corresponding to the first office. This makes it possible to notify the employees of the first office that the vehicle 1 will visit the first office. It is thus possible for the first office to prepare for the visit of the vehicle 1.

In addition, in the tire management system 200, after the route information is output, it is determined whether or not the vehicle 1 is moving according to the route information. Subsequently, when it is determined that the vehicle 1 is moving according to the route information, the first notification information is output to the output destination corresponding to the first office. This makes it possible for the first notification information to be output only when the vehicle 1 is moving according to the route information. It is thus possible to restrict the preparation for the visit in the first office from being wasted.

In addition, in the tire management system 200, when the route information is output, it is determined whether or not an article used for the maintenance service is present in the first office. Subsequently, when it is determined that the article is absent, the second notification information including an indication of the fact is output to an output destination corresponding to the second office that is, among the plurality of offices, closest to the location of the first office and has the article. This makes it possible to notify the employees of the second office that the article is absent in the first office, and urge the employees to send the article. It is thus possible to eliminate the time and effort for the employees of the first office to arrange the article that is absent.

It is noted that the vehicle 1 may be a rental vehicle. In addition, the vehicle 1 is not limited to an automobile, but may be any entity to which the tire 11 is attached. For example, the vehicle 1 may include a motorcycle, a three-wheel riding vehicle, a truck, and a bus.

Third Embodiment

Figure 7:
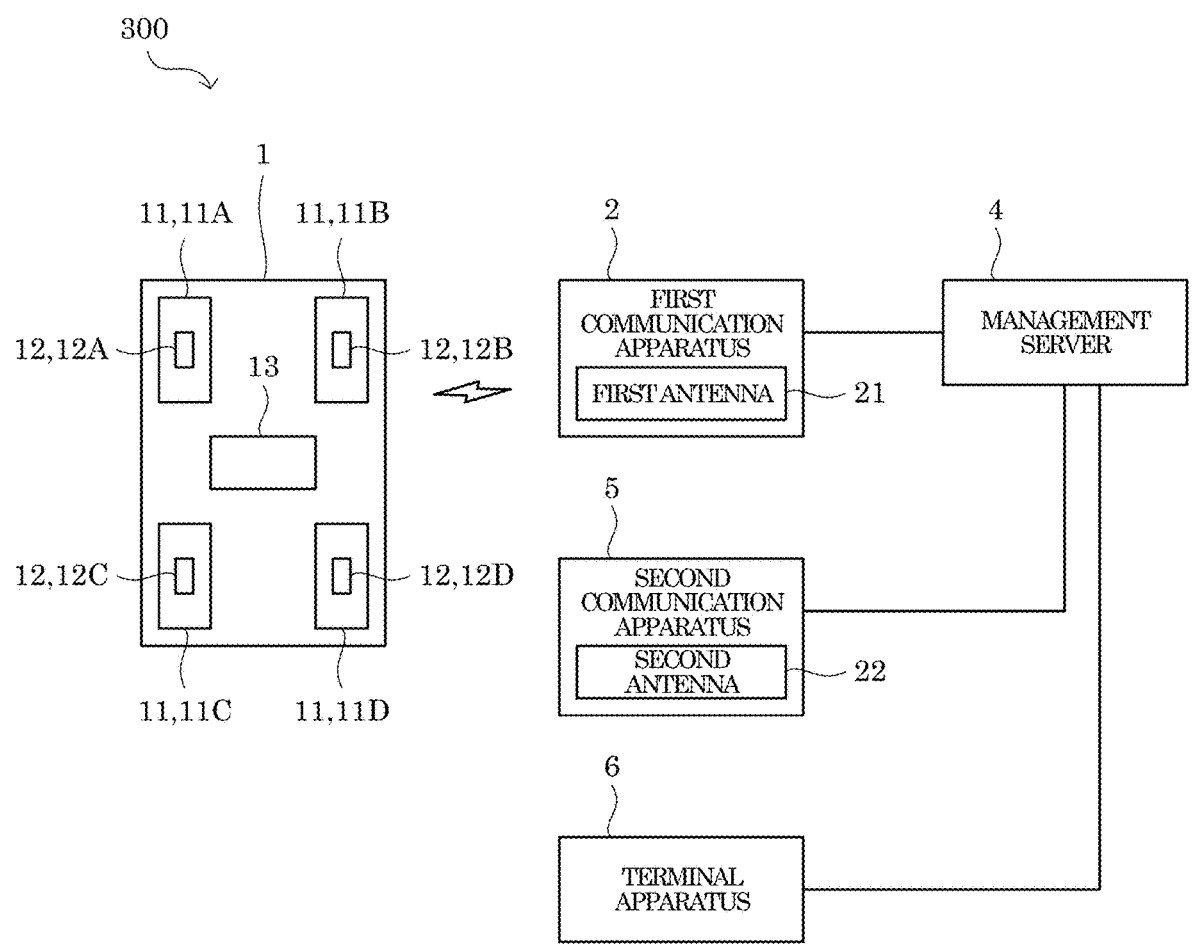
FIG. 7 is a diagram showing a configuration of a tire management system according to a third embodiment of the present disclosure.
Figure 8:
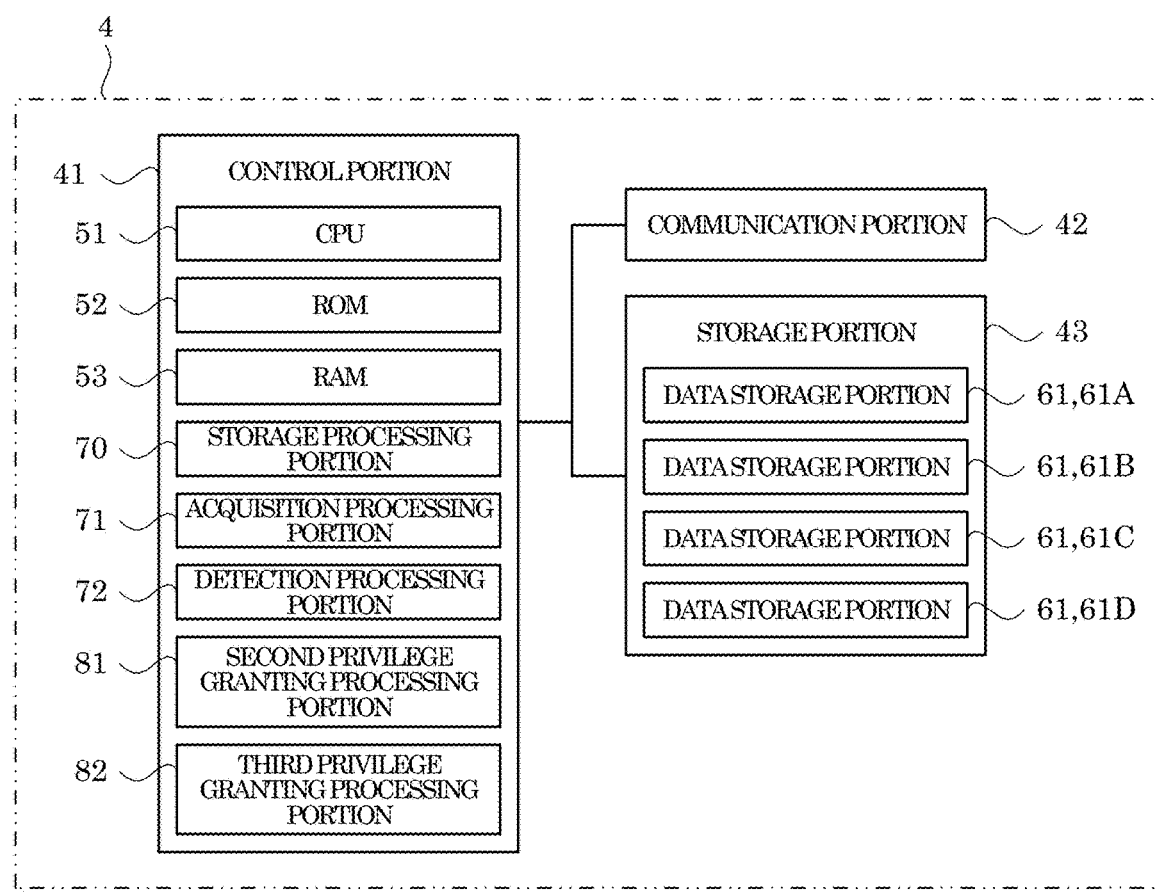
FIG. 8 is a diagram showing a configuration of a management server of the tire management system according to the third embodiment of the present disclosure.

Next, with reference to FIG. 7 and FIG. 8, a description is given of a configuration of a tire management system 300 according to a third embodiment of the present disclosure.

As shown in FIG. 7, the tire management system 300 includes the vehicle 1, the first communication apparatus 2, the management server 4, the second communication apparatus 5, and the terminal apparatus 6. In the tire management system 300, the management server 4 is connected so as to mutually communicate with the first communication apparatus 2, the second communication apparatus 5, and the terminal apparatus 6. It is noted that the first communication apparatus 2 and the second communication apparatus 5 have the same configuration as those of the tire management system 200.

In the tire management system 300, the vehicle 1 is a rental vehicle that is rented out to the user. In addition, in the tire management system 300, the function of the vehicle-mounted communication apparatus 13 is different from the function in the tire management system 200. It is noted that the other configurations of the vehicle 1 are the same as those of the vehicle 1 in the tire management system 200.

Specifically, the vehicle-mounted communication apparatus 13 does not have the function to perform communication with the air pressure detection devices 12. The vehicle-mounted communication apparatus 13 acquires the position information indicating the current position of the vehicle 1, and transmits the received position information to the second communication apparatus 5 at a predetermined transmission cycle. The transmission cycle may be the same as or different from the execution cycle. In addition, the vehicle-mounted communication apparatus 13 includes the display portion that is used to display information output from the management server 4.

In the tire management system 300, the terminal apparatus 6 is installed at the gas station at which the first communication apparatus 2 is installed. It is noted that the other configurations of the terminal apparatus 6 are the same as those of the terminal apparatus 6 in the tire management system 200.

The management server 4 of the tire management system 300 differs in configuration from that of the tire management system 200 in the following points. Specifically, the tire management system 300 differs in the storage content of the storage portion 43 from the tire management system 200. In addition, the tire management system 300 differs in the function of the control portion 41 from the tire management system 200. It is noted that the other configurations of the management server 4 of the tire management system 300 are the same as those of the tire management system 200. The following describes only configurations of the management server 4 different from those of the tire management system 200.

The storage portion 43 stores rental period information indicating a rental period of the vehicle 1. The rental period information is stored in association with the vehicle information in the storage portion 43. It is noted that the user identification information included in the vehicle information is used to identify the user who rents the vehicle 1.

In addition, in the storage portion 43, instead of the office information, gas station information for each gas station is preliminarily stored. The gas station information is information regarding the gas station. The gas station information includes: gas station identification information used for identifying the gas station; and information such as the name, the location, and the telephone number of the gas station. In addition, the gas station information includes: the communication apparatus identification information used for identifying the first communication apparatus 2; and the terminal apparatus identification information used for identifying the terminal apparatus 6.

As shown in FIG. 8, the management server 4 includes the storage processing portion 70, the acquisition processing portion 71, the detection processing portion 72, a second privilege granting processing portion 81, and a third privilege granting processing portion 82.

The storage processing portion 70 stores, in the storage portion 43, the state information acquired by the first communication apparatus 2. In the tire management system 300, the state information includes the air pressure information and the air temperature information, but does not include the tire images. For example, the storage processing portion 70 stores, in the storage portion 43, the air pressure information corrected based on the air temperature information.

Upon arrival of the acquisition timing, the acquisition processing portion 71 acquires the state information that has been stored in the storage portion 43 by the storage processing portion 70.

The detection processing portion 72 detects the abnormality based on the state information acquired by the acquisition processing portion 71. In the tire management system 300, the abnormality includes the first abnormality and the second abnormality, but does not include the third abnormality, the fourth abnormality, and the fifth abnormality.

When the air pressure information stored in the storage portion 43 is in a predetermined second reference range, the second privilege granting processing portion 81 grants a predetermined second privilege to the user. The second reference range corresponds to a part of the first reference range. It is noted that the second reference range may be the same as the first reference range. The second reference range is an example of a reference range of the present disclosure.

For example, the second privilege is a discount coupon that is used to reduce a fee for repairing a puncture of the tire 11 or a fee for tire replacement. It is noted that the second privilege may be the same as the first privilege.

Specifically, when the air pressure information stored in the storage portion 43 is in the second reference range, and a predetermined granting condition is satisfied, the second privilege granting processing portion 81 grants the second privilege to the user.

For example, the granting condition is that both a first condition and a second condition shown in the following are satisfied.

The first condition is that the traveling path of the vehicle 1 during a predetermined first specific period satisfies a predetermined first specific condition. For example, the first specific period is a period of one week until the air pressure information determined as being in the second reference range is acquired. In addition, the first specific condition is that the traveling path of the vehicle 1 is not deviated from the road on predetermined map data. The map data is data that includes a map of a predetermined region including the location of the gas station.

Specifically, the second privilege granting processing portion 81 determines whether or not the first condition is satisfied, based on the position information transmitted from the vehicle 1.

It is noted that the first specific period may be an arbitrary period until the air pressure information determined as being in the second reference range is acquired. In addition, the first specific period may be an arbitrary period from the time when the air pressure information determined as being in the second reference range is acquired. In addition, the first specific period may be an arbitrary period including the time when the air pressure information determined as being in the second reference range is acquired. In addition, the first specific condition may be that the traveling path of the vehicle 1 has not come in contact with the boundary line of the road on the map data, or that the distance from the boundary line has not become smaller than a predetermined distance.

In addition, the second condition is that the user receives, at the gas station, both the refueling service and a specific service that is different from the refueling service. For example, the specific service is an inspection service of the vehicle 1, a carwash service of the vehicle 1, or a replacement service of a consumable of the vehicle 1. It is noted that the second condition may be that the user receives the refueling service at the gas station. In addition, the second condition may be that the user receives the specific service at the gas station. In addition, the second condition may be that the user receives the refueling service or the specific service at the gas station.

Specifically, the second privilege granting processing portion 81 determines whether or not the second condition is satisfied, based on second provision information transmitted from the terminal apparatus 6, the second provision information including content of a service that has been provided to the user at the gas station. The terminal apparatus 6 transmits the second provision information to the management server 4 in response to a predetermined input operation performed on an operation portion of the terminal apparatus 6.

It is noted that the granting condition may be that the following third condition is satisfied. The third condition is that the time when the air pressure information determined as being in the second reference range is acquired, is included in a second specific period that includes the end of the rental period of the vehicle 1. For example, the second specific period is one hour until the end of the rental period of the vehicle 1. The second privilege granting processing portion 81 determines whether or not the third condition is satisfied based on the rental period information stored in the storage portion 43. In a case where the granting condition is that the third condition is satisfied, the second privilege may be a discount coupon that is used to reduce the rental fee of the vehicle 1. It is noted that the second specific period may be an arbitrary period until the end of the rental period of the vehicle 1. In addition, the second specific period may be an arbitrary period that includes the end of the rental period of the vehicle 1.

In addition, the granting condition may be that the following fourth condition is satisfied. The fourth condition is that the visiting frequency of the user to the gas station satisfies a predetermined second specific condition. For example, the second specific condition is that the visiting frequency is twice or more per month. For example, the visiting frequency is calculated based on the number times that the user visits the gas station during one month until the air pressure information determined as being in the second reference range is acquired or during an arbitrary period. The number times that the user visits the gas station is determined based on the reception date/time information included in the first additional data stored in the storage portion 43. In a case where the granting condition is that the fourth condition is satisfied, the second privilege may be a discount coupon that is used to reduce the rental fee of the vehicle 1 or the fee for gasoline. It is noted that the second specific condition may be different from the above-described content.

In addition, the granting condition may be that the fourth condition and the second condition are satisfied.

In addition, the granting condition may be composed of any one of the above-described first condition, second condition, third condition, and fourth condition, or may be composed of two or more of the conditions.

It is noted that the second privilege granting processing portion 81 may unconditionally grant the second privilege to the user when the air pressure information stored in the storage portion 43 is in the second reference range.

The third privilege granting processing portion 82 grants a predetermined third privilege when the second abnormality had been detected by the detection processing portion 72 and the user received the tire replacement service at the gas station. The second abnormality is an example of a specific abnormality of the present disclosure.

For example, the third privilege is a discount coupon that is used to reduce the rental fee of the vehicle 1 or the fee for gasoline. It is noted that the third privilege may be the same as the first privilege or the second privilege.

Specifically, the third privilege granting processing portion 82 determines whether or not the user received the tire replacement service based on the second provision information transmitted from the terminal apparatus 6. It is noted that the third privilege granting processing portion 82 may determine whether or not the user received the tire replacement service based on the state information that was stored in the storage portion 43 after the second abnormality had been detected.

[Third Tire Management Process]

Figure 9:
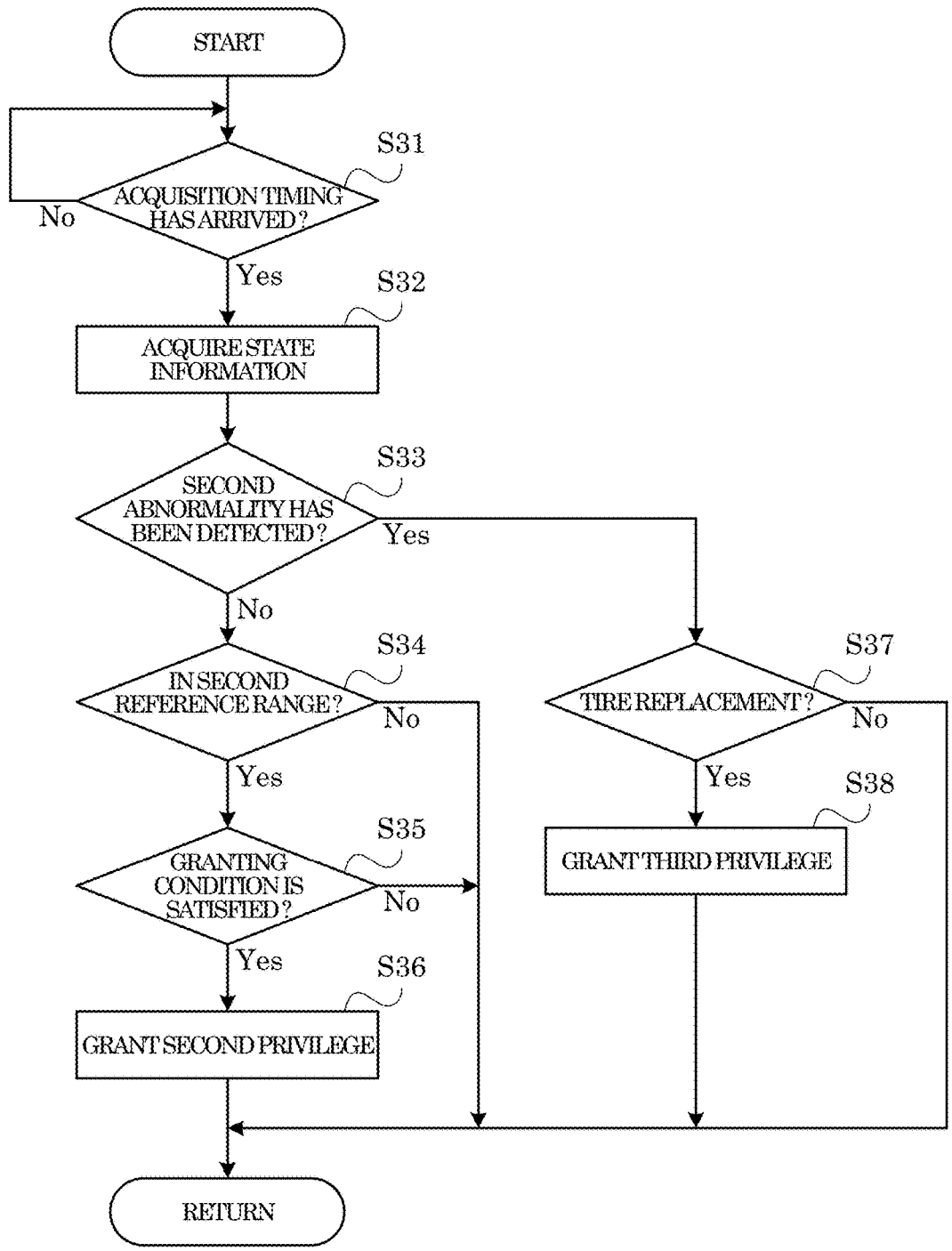
FIG. 9 is a flowchart showing an example of a third tire management process executed by the management server of the tire management system according to the third embodiment of the present disclosure.

In the following, with reference to FIG. 9, a description is given of an example of the procedure of a third tire management process executed by the control portion 41 of the management server 4 in the tire management system 300.

<Step S31>

First, in step S31, the control portion 41 determines whether or not the acquisition timing has arrived. Here, the process of step S31 is executed by the acquisition processing portion 71 of the control portion 41.

Here, upon determining that the acquisition timing has arrived (Yes side at step S31), the control portion 41 moves the process to step S32. In addition, upon determining that the acquisition timing has not arrived (No side at step S31), the control portion 41 waits, at step S31, for the acquisition timing to arrive.

<Step S32>

In step S32, the control portion 41 acquires the state information. Here, the process of step S32 is executed by the acquisition processing portion 71 of the control portion 41.

<Step S33>

In step S33, the control portion 41 determines whether or not the second abnormality has been detected, based on the state information acquired in step S32. Here, the process of step S33 is executed by the detection processing portion 72 of the control portion 41.

Here, upon determining that the second abnormality has been detected (Yes side at step S33), the control portion 41 moves the process to step S37. In addition, upon determining that the second abnormality has not been detected (No side at step S33), the control portion 41 moves the process to step S34.

<Step S34>

In step S34, the control portion 41 determines whether or not the air pressure information acquired in step S32 is in the second reference range. Here, the process of step S34 is executed by the second privilege granting processing portion 81 of the control portion 41.

Here, upon determining that the air pressure information acquired in step S32 is in the second reference range (Yes side at step S34), the control portion 41 moves the process to step S35. In addition, upon determining that the air pressure information acquired in step S32 is not in the second reference range (No side at step S34), the control portion 41 moves the process to step S31.

<Step S35>

In step S35, the control portion 41 determines whether or not the granting condition is satisfied. Here, the process of step S35 is executed by the second privilege granting processing portion 81 of the control portion 41.

Here, upon determining that the granting condition is satisfied (Yes side at step S35), the control portion 41 moves the process to step S36. In addition, upon determining that the granting condition is not satisfied (No side at step S35), the control portion 41 moves the process to step S31.

<Step S36>

In step S36, the control portion 41 grants the second privilege to the user. Here, the process of step S36 is executed by the second privilege granting processing portion 81 of the control portion 41.

<Step S37>

In step S37, the control portion 41 determines whether or not the user received the tire replacement service at the gas station. Here, the process of step S37 is executed by the third privilege granting processing portion 82 of the control portion 41.

Here, upon determining that the user received the tire replacement service at the gas station (Yes side at step S37), the control portion 41 moves the process to step S38. In addition, upon determining that the user has not received the tire replacement service at the gas station (No side at step S37), the control portion 41 moves the process to step S31.

<Step S38>

In step S38, the control portion 41 grants the third privilege to the user. Here, the process of step S38 is executed by the third privilege granting processing portion 82 of the control portion 41.

As described above, in the tire management system 300, the specific range corresponds to the gas station. In addition, the vehicle 1 is a rental vehicle rented out to the user. In addition, the state information includes the air pressure of the tire 11. In addition, in the tire management system 300, the second privilege is granted to the user when the air pressure information stored in the storage portion 43 is in the second reference range. This motivates the user to visit the gas station. It is thus possible to attract the vehicle 1 on which the user is riding to the gas station.

In addition, the tire management system 300 is configured to grant the second privilege to the user when the traveling path of the vehicle 1 during the first specific period satisfies the first specific condition. This makes it possible to restrict the second privilege from being granted to the user when an abnormality is found in the traveling path of the vehicle 1. It is thus possible to urge a normal driving of the vehicle 1 on which the user is riding.

In addition, the tire management system 300 is configured to grant the second privilege to the user when the user has received the refueling service and the specific service at the gas station. This makes it possible to restrict the second privilege from being granted to the user when the user has not received either or both of the refueling service and the specific service. It is thus possible to urge the user to use the refueling service and the specific service.

In addition, the tire management system 300 is configured to grant the second privilege to the user when the time when the air pressure information is acquired is included in the second specific period that includes the end of the rental period of the vehicle 1. This motivates the user to visit the gas station before the end of the rental period of the vehicle 1 and receive the air pressure adjustment service. It is thus possible to urge the user to return the vehicle 1 in a state where no abnormality is present in the air pressure.

In addition, the tire management system 300 is configured to grant the second privilege to the user when the visiting frequency of the user to the gas station satisfies the second specific condition. This makes it possible to restrict the second privilege from being granted to the user when the visiting frequency of the user to the gas station is low. It is thus possible to urge the user to visit the gas station frequently.

In addition, the tire management system 300 is configured to grant the third privilege to the user when the second abnormality had been detected and the user received the tire replacement service at the gas station. This motivates the user to receive provision of the tire replacement service when the second abnormality is present. It is thus possible to urge the user to use the tire replacement service when the second abnormality is present.

The following describes configurations of the present disclosure included in the present specification.

A tire management system according to an aspect of the present disclosure includes an acquisition processing portion, a detection processing portion, and a first output processing portion. The acquisition processing portion acquires state information regarding a state of a pneumatic tire attached to a vehicle. The detection processing portion detects an abnormality of the pneumatic tire based on the state information acquired by the acquisition processing portion. The first output processing portion, when the detection processing portion has detected the abnormality, outputs, to an output destination corresponding to the vehicle, guide information that is used to guide to an office where a maintenance service corresponding to the abnormality is provided.

With the above-described configuration, it is possible to, when the abnormality of a tire has been detected, transmit the guide information to the driver of the vehicle or the like. It is thus possible to urge the driver or the like to cope with the abnormality.

In the tire management system according to the present disclosure, the guide information includes coupon information that is used to reduce a fee for the maintenance service.

With the above-described configuration, it is possible to motivate the driver of the vehicle or the like to move to the office. It is thus possible to guide the vehicle to the office.

In the tire management system according to the present disclosure, the guide information includes route information that indicates a route to a location of a first office that is, among a plurality of offices, closest to a current position of the vehicle.

With the above-described configuration, it is possible to indicate, to the driver of the vehicle or the like, a route to the location of an office that is closest to the current position. It is thus possible to guide the vehicle to the office.

The tire management system according to the present disclosure includes a second output processing portion configured to, when the route information is output, output first notification information that includes an indication of the fact, to an output destination corresponding to the first office.

With the above-described configuration, it is possible to notify the employees of the first office that the vehicle will visit the first office. It is thus possible for the first office to prepare for the visit of the vehicle.

The tire management system according to the present disclosure includes a first determination processing portion. The first determination processing portion, after the route information is output, determines whether or not the vehicle is moving according to the route information. In addition, when the first determination processing portion has determined that the vehicle is moving according to the route information, the second output processing portion, outputs the first notification information to the output destination corresponding to the first office.

With the above-described configuration, it is possible for the first notification information to be output only when the vehicle is moving according to the route information. It is thus possible to restrict the preparation for the visit in the first office from being wasted.

The tire management system according to the present disclosure includes a second determination processing portion and a third output processing portion. The second determination processing portion, when the route information is output, determines whether or not an article used for the maintenance service is present in the first office. The third output processing portion, when the second determination processing portion has determined that the article is absent, outputs second notification information including an indication of the fact to an output destination corresponding to a second office that is, among the plurality of offices, closest to the location of the first office and has the article.

With the above-described configuration, it is possible to notify the employees of the second office that the article is absent in the first office, and urge the employees to send the article. It is thus possible to eliminate the time and effort for the employees of the first office to arrange the article that is absent.

The tire management system according to the present disclosure includes a third determination processing portion and a privilege granting processing portion. The third determination processing portion, after the guide information is output, determines whether or not the maintenance service was provided. The privilege granting processing portion, when the third determination processing portion has determined that the maintenance service was provided, grants a predetermined privilege to a user corresponding to the vehicle.

With the above-described configuration, it is possible to motivate the driver of the vehicle or the like to receive provision of the maintenance service. It is thus possible to strongly urge the driver or the like to cope with the abnormality.

In the tire management system according to the present disclosure, the third determination processing portion determines whether or not the maintenance service was provided, based on the state information acquired by the acquisition processing portion after the guide information is output.

With the above-described configuration, it is possible to automatically determine whether or not the maintenance service was provided. Accordingly, compared with a configuration where information for the determination is input manually, it is possible to eliminate the time and effort to input the information.

A tire management method according to another aspect of the present disclosure includes an acquisition step, a detection step, and an output step. In the acquisition step, state information regarding a state of a pneumatic tire attached to a vehicle is acquired. In the detection step, an abnormality of the pneumatic tire is detected based on the state information acquired in the acquisition step. In the output step, when the abnormality has been detected in the detection step, guide information that is used to guide to an office where a maintenance service corresponding to the abnormality is provided, is output to an output destination corresponding to the vehicle.

The embodiments of the present disclosure described above include the following disclosure items (1) to (15).

Disclosure item (1) is a tire management system including: an information acquisition portion configured to acquire state information regarding a state of a pneumatic tire attached to a vehicle when the vehicle is located in a predetermined specific range; and a storage processing portion configured to store, into a predetermined storage portion, the state information acquired by the information acquisition portion.

With the above-described configuration, it is possible to acquire information regarding the state of tires of a vehicle that has visited a predetermined place.

Disclosure item (2) is the tire management system according to the disclosure item (1), including: a detection processing portion configured to detect an abnormality of the pneumatic tire based on the state information stored in the storage portion; and a first output processing portion configured to, when the detection processing portion has detected the abnormality, output, to an output destination corresponding to the vehicle, coupon information that is used to reduce a fee for a maintenance service corresponding to the abnormality.

With the above-described configuration, it is possible to motivate the driver of the vehicle or the like to receive provision of the maintenance service. It is thus possible to urge the driver or the like to cope with the abnormality of the tires.

Disclosure item (3) is the tire management system according to the disclosure item (2), including: a first determination processing portion configured to, after the coupon information is output, determine whether or not the maintenance service was provided; and a first privilege granting processing portion configured to, when the first determination processing portion has determined that the maintenance service was provided, grant a predetermined first privilege to a user corresponding to the vehicle.

With the above-described configuration, it is possible to further motivate the driver of the vehicle or the like to receive provision of the maintenance service. It is thus possible to strongly urge the driver or the like to cope with the abnormality.

Disclosure item (4) is the tire management system according to the disclosure item (1), including: a detection processing portion configured to detect an abnormality of the pneumatic tire based on the state information stored in the storage portion; and a second output processing portion configured to, when the detection processing portion has detected the abnormality, output, to an output destination corresponding to the vehicle, route information that indicates a route to a location of a first office that is, among a plurality of offices where a maintenance service corresponding to the abnormality is provided, closest to a current position of the vehicle.

With the above-described configuration, it is possible to indicate to the driver of the vehicle or the like a route to the location of an office that is closest to the current position. It is thus possible to urge the driver or the like to cope with the abnormality.

Disclosure item (5) is the tire management system according to the disclosure item (4), including: a second determination processing portion configured to, after the second output processing portion outputs the route information, determine whether or not the vehicle is moving according to the route information; and a third output processing portion configured to, when the second determination processing portion has determined that the vehicle is moving according to the route information, output first notification information that includes an indication that the route information has been output, to an output destination corresponding to the first office.

With the above-described configuration, it is possible to notify the employees of the first office that the vehicle will visit the first office. It is thus possible for the first office to prepare for the visit of the vehicle.

Disclosure item (6) is the tire management system according to the disclosure item (4) or (5), including: a third determination processing portion configured to, when the second output processing portion outputs the route information, determine whether or not an article used for the maintenance service is present in the first office; and a fourth output processing portion configured to, when the third determination processing portion has determined that the article is absent, output second notification information including an indication of the fact to an output destination corresponding to a second office that is, among the plurality of offices, closest to the location of the first office and has the article.

With the above-described configuration, it is possible to notify the employees of the second office that the article is absent in the first office, and urge the employees to send the article. It is thus possible to eliminate the time and effort for the employees of the first office to arrange the article that is absent.

Disclosure item (7) is the tire management system according to the disclosure item (1), wherein the specific range is a range corresponding to a gas station of the vehicle, the vehicle is a rental vehicle that is rented out to a user, the state information includes an air pressure of the pneumatic tire, and the tire management system includes a second privilege granting processing portion configured to, when the air pressure stored in the storage portion is in a predetermined reference range, grant a predetermined second privilege to the user.

With the above-described configuration, it is possible to motivate the user to visit the gas station. It is thus possible to attract the vehicle on which the user is riding to the gas station.

Disclosure item (8) is the tire management system according to the disclosure item (7), wherein the second privilege granting processing portion grants the second privilege to the user when a traveling path of the vehicle during a predetermined first specific period satisfies a predetermined first specific condition.

With the above-described configuration, it is possible to restrict the second privilege from being granted to the user when an abnormality is found in the traveling path of the vehicle. It is thus possible to urge a normal driving of the vehicle on which the user is riding.

Disclosure item (9) is the tire management system according to the disclosure item (7) or (8), wherein the second privilege granting processing portion grants the second privilege to the user when the user has received a refueling service at the gas station.

With the above-described configuration, it is possible to restrict the second privilege from being granted to the user when the user does not receive the refueling service. It is thus possible to urge the user to use the refueling service.

Disclosure item (10) is the tire management system according to the disclosure item (7) or (8), wherein the second privilege granting processing portion grants the second privilege to the user when the user has received, at the gas station, a refueling service and a specific service that is different from the refueling service.

With the above-described configuration, it is possible to restrict the second privilege from being granted to the user when the user does not receive either or both of the refueling service and the specific service. It is thus possible to urge the user to use the refueling service and the specific service.

Disclosure item (11) is the tire management system according to the disclosure item (7), wherein the second privilege granting processing portion grants the second privilege to the user when a time when the air pressure is acquired, is included in a second specific period that includes an end of a rental period of the vehicle.

With the above-described configuration, it is possible to motivate the user to visit the gas station before the end of the rental period of the vehicle and receive the air pressure adjustment service. It is thus possible to urge the user to return the vehicle in a state where no abnormality is present in the air pressure.

Disclosure item (12) is the tire management system according to the disclosure item (7), wherein the second privilege granting processing portion grants the second privilege to the user when a visiting frequency of the user to the gas station satisfies a predetermined second specific condition.

With the above-described configuration, it is possible to restrict the second privilege from being granted to the user when the visiting frequency of the user to the gas station is low. It is thus possible to urge the user to visit the gas station frequently.

Disclosure item (13) is the tire management system according to the disclosure item (12), wherein the second privilege granting processing portion grants the second privilege to the user when the user has received, at the gas station, a refueling service or a specific service that is different from the refueling service.

With the above-described configuration, it is possible to restrict the second privilege from being granted to the user when the user does not receive the refueling service or the specific service. It is thus possible to urge the user to use the refueling service or the specific service.

Disclosure item (14) is the tire management system according to the disclosure item (1), wherein the specific range is a range corresponding to a gas station of the vehicle, the vehicle is a rental vehicle that is rented out to a user, the state information includes an air pressure of the pneumatic tire, and the tire management system includes: a detection processing portion configured to detect a specific abnormality of the pneumatic tire based on the air pressure stored in the storage portion; and a third privilege granting processing portion configured to grant a predetermined third privilege when the specific abnormality had been detected by the detection processing portion and the user received a tire replacement service at the gas station.

With the above-described configuration, it is possible to motivate the user to receive provision of the tire replacement service when the abnormality is present. It is thus possible to urge the user to use the tire replacement service when the tire is abnormal.

Disclosure item (15) is a tire management method including: an acquisition step of acquiring state information regarding a state of a pneumatic tire attached to a vehicle when the vehicle is located in a predetermined specific range; and a storage step of storing, into a predetermined storage portion, the state information acquired in the acquisition step.

The invention claimed is:

1. A tire management system comprising:
   processing circuitry configured to function as:
   an acquisition processing portion configured to acquire, from at least a tire image acquisition apparatus, via a wireless communication network, state information regarding a state of a pneumatic tire attached to a vehicle when the vehicle is located in a predetermined specific range associated with the tire image acquisition apparatus;
   a storage processing portion configured to store, into a predetermined storage portion, the state information acquired by the acquisition processing portion;
   a detection processing portion configured to detect an abnormality of the pneumatic tire based on the state information stored in the storage portion;
   a second output processing portion configured to, under a condition where the detection processing portion has detected the abnormality, wirelessly output, to a first output destination corresponding to the vehicle for display on a display of the vehicle, route information that indicates a route to a first location of a first office that is, among a plurality of offices where a maintenance service corresponding to the abnormality is provided, closest to a current position of the vehicle;
   a third determination processing portion configured to, under a condition where the second output processing portion outputs the route information, determine whether or not an article used for the maintenance service is present in the first office; and
   a fourth output processing portion configured to, under a condition where the third determination processing portion has determined that the article is absent at the first office, output second notification information, which includes an indication of the fact, to a third output destination corresponding to a second office that is, among the plurality of offices, closest to the first location of the first office and has the article; and
   the tire image acquisition apparatus,
   wherein the tire image acquisition apparatus is configured to acquire a tire image showing a ground-contact surface of the pneumatic tire as the state information regarding the state of the pneumatic tire,
   wherein the tire image acquisition apparatus includes at least one image acquirer to acquire, under a condition where the pneumatic tire is on a photographing surface of the tire image acquisition apparatus, the tire image showing the ground-contact surface of the pneumatic tire, and
   wherein the tire image acquisition apparatus is configured to output to the processing circuitry via the wireless communication network the state information regarding the state of the pneumatic tire corresponding to the ground-contact surface of the pneumatic tire.

2. The tire management system according to claim 1, wherein the processing circuitry is configured to function as:
   a second determination processing portion configured to, after the second output processing portion outputs the route information, determine whether or not the vehicle is moving according to the route information; and
   a third output processing portion configured, to under a condition where the second determination processing portion has determined that the vehicle is moving according to the route information, output first notification information, which includes an indication that the route information has been output, to a second output destination corresponding to the first office.

3. The tire management system according to claim 1, further comprising:
   a first communication apparatus having a first antenna at a second location remote from the first location; and
   a second communication apparatus having a second antenna, wherein the processing circuitry receives the state information according to only a first format in a first case where the vehicle is located in the predetermined specific range associated with the first communication apparatus, and wherein the processing circuitry receives the state information according to only a second format different from the first format in a second case where the vehicle is not located in the predetermined specific range associated with the first communication apparatus.

4. The tire management system according to claim 1, further comprising:

a first communication apparatus having a first antenna; and a second communication apparatus having a second antenna, wherein first state data corresponding to a first portion of the state information regarding the state of the pneumatic tire attached to the vehicle when the vehicle is located in the predetermined specific range from the first communication apparatus is received by the first communication apparatus according to a first wireless communication standard corresponding to the predetermined specific range, and wherein second state data, different from the first state data and corresponding to a second portion of the state information regarding the state of the pneumatic tire attached to the vehicle when the vehicle is located in the predetermined specific range from the second communication apparatus is received by the second communication apparatus according to a second wireless communication standard different from the first wireless communication standard and having a range greater than the predetermined specific range.

5. The tire management system according to claim 4, wherein the second portion of the state information includes position information regarding the current position of the vehicle.

6. The tire management system according to claim 1, further comprising:

a first communication apparatus having a first antenna, wherein the first communication apparatus having the first antenna is configured to receive, from one or more detectors on or in the pneumatic tire, according to a predetermined first wireless communication standard, data corresponding to detected air pressure and air temperature in the pneumatic tire, when the vehicle is located in the predetermined specific range associated with the first communication apparatus.

7. The tire management system according to claim 6, further comprising:

the one or more detectors on or in the pneumatic tire, wherein the one or more detectors are configured to output the data corresponding to detected air pressure and air temperature in the pneumatic tire to the first communication apparatus according to the first wireless communication standard.

8. The tire management system according to claim 6, further comprising:

a second communication apparatus having a second antenna, wherein the second communication apparatus having the second antenna is configured to receive, from a vehicle-mounted communication apparatus external to the pneumatic tire, data corresponding to the detected air pressure detected by the one or more detectors on or in the pneumatic tire, according to a predetermined second wireless communication standard different from the predetermined first wireless communication standard, when the vehicle is located in a predetermined specific range associated with the second communication apparatus, and wherein a second range associated with the predetermined second wireless communication standard is greater than a first range associated with the predetermined first wireless communication standard.

9. A tire management system comprising:

a non-volatile computer-readable memory; and a processor operatively coupled to access the non-volatile computer-readable memory and configured to function as:

an acquisition processing portion configured to acquire, from a first communication apparatus having a first antenna, a second communication apparatus having a second antenna, and a tire image acquisition apparatus, respective state information regarding a state of a pneumatic tire attached to a vehicle when the vehicle is located in a predetermined specific range respectively associated with the first communication apparatus, the second communication apparatus, and the tire image acquisition apparatus;

a storage processing portion configured to store, into a predetermined storage portion, the state information acquired by the acquisition processing portion;

a detection processing portion configured to detect an abnormality of the pneumatic tire based on the state information stored in the storage portion;

a second output processing portion configured to, under a condition where the detection processing portion has detected the abnormality, wirelessly output, to a first output destination corresponding to the vehicle for display on a display of the vehicle, route information that indicates a route to a first location of a first office that is, among a plurality of offices where a maintenance service corresponding to the abnormality is provided, closest to a current position of the vehicle;

a third determination processing portion configured to, under a condition where the second output processing portion outputs the route information, determine whether or not an article used for the maintenance service is present in the first office; and a fourth output processing portion configured to, under a condition where the third determination processing portion has determined that the article is absent at the first office, output second notification information, which includes an indication of the fact, to a third output destination corresponding to a second office that is, among the plurality of offices, closest to the first location of the first office and has the article;

the tire image acquisition apparatus; and the first communication apparatus having the first antenna and/or the second communication apparatus having the second antenna, wherein the tire image acquisition apparatus is configured to acquire a tire image showing a ground-contact surface of the pneumatic tire as the state information regarding the state of the pneumatic tire, wherein the tire image acquisition apparatus includes at least one image acquirer to acquire, under a condition where the pneumatic tire is in contact with a photographing surface of the tire image acquisition apparatus, the tire image showing the ground-contact surface of the pneumatic tire, wherein the tire image acquisition apparatus is configured to output to the processor the state information regarding the state of the pneumatic tire corresponding to the ground-contact surface of the pneumatic tire, and wherein each of the first communication apparatus, the second communication apparatus, and the tire image acquisition apparatus is offboard the vehicle.

10. The tire management system according to claim 9, wherein the processor, the first communication apparatus, and the tire image acquisition apparatus are at a second location remote from the first location.

11. The tire management system according to claim 9, wherein the state information includes one or more of air pressure information indicating an air pressure in the pneumatic tire, air temperature information indicating an air temperature in the pneumatic tire, and/or a tire image indicating a state of a ground-contact surface of the pneumatic tire, wherein the specific range corresponding to the first communication apparatus is a communication range of wireless communication according to a first wireless communication standard, wherein the specific range corresponding to the second communication apparatus is a communication range of wireless communication according to a second wireless communication standard that is different from the first wireless communication standard, wherein the specific range corresponding to the tire image acquisition device is a photographing range of a camera that photographs the ground-contact surface of the pneumatic tire, wherein the first communication apparatus acquires the air pressure information and the air temperature information sent from an air pressure detection device of the pneumatic tire of the vehicle when the vehicle is within the communication range of wireless communication according to the first wireless communication standard, wherein the second communication apparatus acquires the air pressure information and the air temperature information sent from the air pressure detection device of the pneumatic tire of the vehicle via a vehicle-mounted communication apparatus when the vehicle is within the communication range of wireless communication according to the second wireless communication standard, and wherein the tire image acquisition device acquires the tire image of the pneumatic tire using the camera when the vehicle is within the photographing range.

12. The tire management system according to claim 9, further comprising the first communication apparatus having the first antenna and the second communication apparatus having the second antenna.

13. The tire management system according to claim 12, wherein the first communication apparatus having the first antenna is configured to receive, from one or more detectors on or in the pneumatic tire, according to a predetermined first wireless communication standard, data corresponding to detected air pressure and air temperature in the pneumatic tire, when the vehicle is located in the predetermined specific range associated with the first communication apparatus, wherein the second communication apparatus having the second antenna is configured to receive, from a vehicle-mounted communication apparatus external to the pneumatic tire, data corresponding to the detected air pressure detected by the one or more detectors on or in the pneumatic tire, according to a predetermined second wireless communication standard different from the predetermined first wireless communication standard, when the vehicle is located in a predetermined specific range associated with the second communication apparatus, and wherein a second range associated with the predetermined second wireless communication standard is greater than a first range associated with the predetermined first wireless communication standard.

* * * * *